US010115268B2

(12) United States Patent
Cage et al.

(10) Patent No.: US 10,115,268 B2
(45) Date of Patent: Oct. 30, 2018

(54) SYSTEMS AND METHODS FOR INTEGRATED GAME PLAY AT PAYMENT-ENABLED TERMINALS

(71) Applicant: LINQ3 TECHNOLOGIES LLC, New York, NY (US)

(72) Inventors: Daniel Cage, Los Angeles, CA (US); David Tashjian, New York, NY (US); Roy Leach, New York, NY (US)

(73) Assignee: LINQ3 TECHNOLOGIES LLC, Atlanta, GA (US)

( * ) Notice: Subject to any disclaimer, the term of this patent is extended or adjusted under 35 U.S.C. 154(b) by 0 days.

(21) Appl. No.: 13/842,709

(22) Filed: Mar. 15, 2013

(65) Prior Publication Data

US 2014/0274314 A1 Sep. 18, 2014

(51) Int. Cl.
*A63F 13/00* (2014.01)
*G07F 17/32* (2006.01)

(52) U.S. Cl.
CPC ........ *G07F 17/3255* (2013.01); *G07F 17/329* (2013.01)

(58) Field of Classification Search
USPC ....................................... 463/17–31; 235/380
See application file for complete search history.

(56) References Cited

U.S. PATENT DOCUMENTS 4,669,730 A 6/1987 Small
4,815,741 A 3/1989 Small
4,833,307 A 5/1989 Gonzalez-Justiz
5,083,272 A 1/1992 Walker et al.
5,216,595 A 6/1993 Protheroe
5,330,185 A 7/1994 Wells
5,417,424 A 5/1995 Snowden et al.
5,890,718 A 4/1999 Byon
5,897,625 A 4/1999 Gustin et al.
5,919,091 A 7/1999 Bell et al.
6,277,026 B1 8/2001 Archer
6,304,860 B1 10/2001 Martin, Jr. et al.
(Continued)

FOREIGN PATENT DOCUMENTS

WO WO 2004/004280 A1 1/2004
WO 2008092034 7/2008
WO 2013026997 2/2013

OTHER PUBLICATIONS

Resubmitted legible International Search Report for PCT/US14/22877 dated Nov. 20, 2014.
(Continued)

*Primary Examiner* — Masud Ahmed
(74) *Attorney, Agent, or Firm* — Baker & McKenzie LLP

(57) ABSTRACT

A game play system and methods for facilitating game play purchases through a payment-enabled terminal store a plurality of records of game play number sets associated with respective payment card numbers. The association of game play number sets with respective payment card numbers allows for substantially "ticketless" lottery wagers, draws, scratch tickets, branded games, and second change games, access to game play purchases beyond the traditional manned lottery authority terminals, automatic redemption by associating a winning game play with a payment card number, and purchase of game plays using payment cards (e.g., debit or credit cards) instead of cash.

59 Claims, 20 Drawing Sheets

(56) References Cited

U.S. PATENT DOCUMENTS

| | | | | |
|---|---|---|---|---|
| 6,322,446 | B1 * | 11/2001 | Yacenda | 463/16 |
| 6,364,206 | B1 | 4/2002 | Keohane | |
| 6,507,823 | B1 | 1/2003 | Nel | |
| 6,585,589 | B2 | 7/2003 | Okuniewicz | |
| 6,869,358 | B2 | 3/2005 | Yacenda | |
| 7,168,616 | B2 * | 1/2007 | Carnation | 235/380 |
| 7,177,428 | B2 | 2/2007 | Gordon et al. | |
| 7,547,251 | B2 | 6/2009 | Walker et al. | |
| 8,103,520 | B2 | 1/2012 | Mueller et al. | |
| 2001/0045456 | A1 | 11/2001 | Smith | |
| 2002/0094858 | A1 | 7/2002 | Yacenda | |
| 2002/0145039 | A1 * | 10/2002 | Carroll | 235/384 |
| 2003/0236749 | A1 | 12/2003 | Shergalis | |
| 2004/0259626 | A1 * | 12/2004 | Akram | G07F 17/32 463/17 |
| 2005/0054438 | A1 | 3/2005 | Rothschild et al. | |
| 2005/0143163 | A1 | 6/2005 | Yacenda | |
| 2005/0153779 | A1 | 7/2005 | Ziegler | |
| 2005/0167488 | A1 | 8/2005 | Higgins et al. | |
| 2005/0211764 | A1 | 9/2005 | Barcelou | |
| 2007/0060284 | A1 * | 3/2007 | Yacenda | 463/17 |
| 2007/0156436 | A1 | 7/2007 | Fisher et al. | |
| 2008/0079573 | A1 | 4/2008 | Bloebaum et al. | |
| 2008/0139306 | A1 | 6/2008 | Lutnick et al. | |
| 2008/0167060 | A1 | 7/2008 | Moshir et al. | |
| 2009/0042633 | A1 | 2/2009 | Yacenda | |
| 2009/0111378 | A1 | 4/2009 | Sheynman et al. | |
| 2009/0137304 | A1 | 5/2009 | Yacenda | |
| 2009/0144161 | A1 | 6/2009 | Fisher | |
| 2009/0239657 | A1 | 9/2009 | Ryan et al. | |
| 2010/0069136 | A1 * | 3/2010 | Safaei et al. | 463/17 |
| 2010/0203943 | A1 * | 8/2010 | Hughes | 463/17 |
| 2011/0034229 | A1 * | 2/2011 | Guziel et al. | 463/17 |
| 2012/0089468 | A1 | 4/2012 | Guziel | |
| 2012/0244930 | A1 | 9/2012 | Cage et al. | |
| 2013/0073388 | A1 * | 3/2013 | Heath | 705/14.53 |

OTHER PUBLICATIONS

Extended European search report dated Sep. 23, 2016 from co-pending European application number.

* cited by examiner

SYSTEMS AND METHODS FOR INTEGRATED GAME PLAY AT PAYMENT-ENABLED TERMINALS

TECHNICAL FIELD

This disclosure generally relates to game play systems for the sale of, for example, sponsored lottery products, and, more specifically, this disclosure relates to providing integrated game play and sale of lottery products on payment-enabled terminals.

BACKGROUND

Various governments around the world allow lottery games to be legalized within their borders. Legalization of lottery games and other game plays is typically driven by the public support for this style of entertainment. Currently, these games are presented through specific manned terminals that connect to lottery operators, or corporations responsible for running the games. The player is provided a paper ticket of the game play or lottery play. The paper ticket is a bearer instrument, in that the holder of the paper ticket—whether the original purchaser or not—is entitled to the winnings associated with that paper ticket.

While these games have proven to be popular, a large segment of the population does not participate. This is due to many factors, including the inconvenience of the manned terminals, the concern over losing a ticket, and, more recently, the lack of cash to play the games as many people prefer using payment cards for their various purchases. In addition, due to regulatory restrictions, the sale of lottery products is restricted to various government-approved entities. These restrictions have created some obstacles in bringing game play sales to a broader spectrum of sale outlets. For example, existing sales solutions used in various sale outlets are not appropriate for the sale of the lottery games (or other game plays) because they lack assurances that the sale outlet is located within the "borders" or restrictions of the government regulating the lottery game.

SUMMARY

Disclosed herein are game play systems and methods for facilitating a game play purchase by a user at a payment-enabled terminal. The game play system may store a plurality of records of game play number sets associated with respective payment card numbers; and receive a payment card number associated with the user. The payment card number may originate at the payment-enabled terminal and may be identified when the user swipes its payment card at the payment-enabled terminal. The game play system may also associate the payment card number with a game play number set received from a gaming operator. The game play system may further communicate to the transaction database the payment card number and game play number set for storage at the transaction database.

These and other advantages of the present disclosure will become apparent to those skilled in the art from the following detailed description, the accompanying drawings, and the appended claims.

DETAILED DESCRIPTION

Figure 1A:
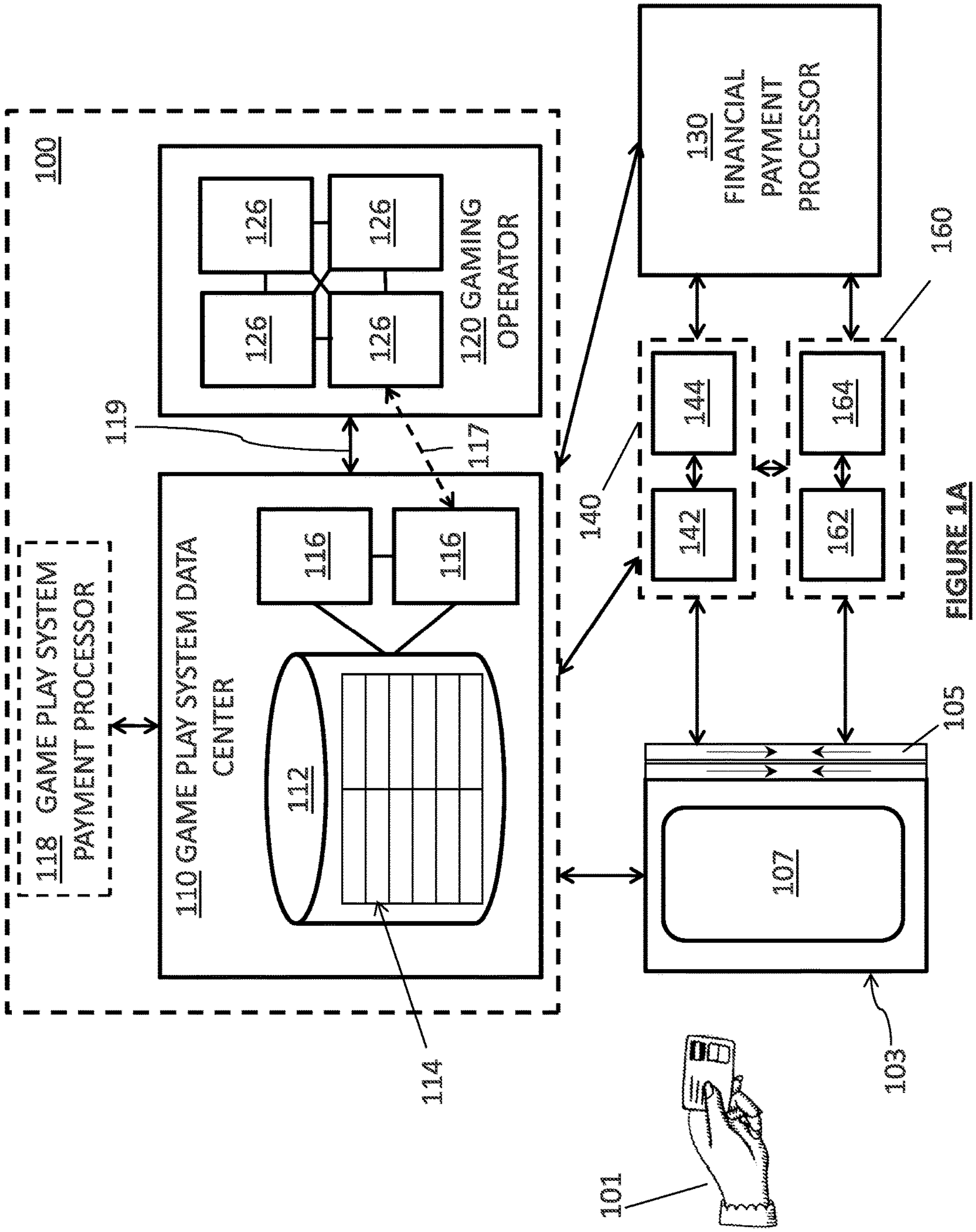
FIG. 1A is a schematic diagram illustrating a game play system, in accordance with the present disclosure.

The present disclosure provides a game play system and game play methods to allow for game play (e.g., lottery play) purchases at a variety of outlets while complying with various governmental restrictions regulating game plays.

Game plays may include various types of games, including, but not limited to lottery wagers, lottery draws, scratch tickets, virtual scratch tickets, branded games, second chance games, etc. Thus, the game play system and game play methods allow access for making game play purchases beyond the traditional manned lottery authority terminals providing paper tickets, although the game play system and game play methods could also be used in the context of manned terminals. Indeed, the game play system and game play methods allow for convenient, every day access to game play purchases at various payment-enabled terminals.

Further, the game play system and game play methods allow for a substantially "ticketless" game play—or, a "ticketless" lottery wager. Specially, the game play system and game play methods provide for storing, managing, and redeeming of game play purchases so that a user is not required to present a paper lottery ticket or lottery bearer instrument to redeem winnings. Instead, a winning game play is associated with the user's payment card number in secure storage within the game play system, and winnings may be automatically directed to an account associated with the user's payment card and/or may be effected based on the user's payment card number. In addition, the game play system and game play methods allow for a user to purchase a game play using a payment card (e.g., a debit or credit card) instead of cash. Similarly, the game play system and game play methods allow for a user to purchase a game play using a device carrying or providing payment card data (e.g., an NFC-enabled user device).

As used herein, payment-enabled terminals may refer to a variety of terminals and payment platforms, including, but not limited to, swipe-enabled terminals, swipe-enabled point of sale (POS) systems, Card Reader in Dispenser terminals (CRIND terminals), payment-enabled "smart" devices (e.g., tablets, netbooks, mobile devices, etc.), payment kiosks, self-service payment terminals, automated teller machines (ATMs), "tap" payment platforms, near-field communication payment platforms, proximity-based communication payment platforms, barcode scan payment platforms, cloud-enabled payment devices and interfaces, and cloud-enabled point of sale platforms.

The game play system and game play methods disclosed herein allow for seamless and integrated game play transactions to a user at a payment-enabled terminal. The game play system and game play methods link gaming partners and financial payment partners together with a user at a payment-enabled terminal. In doing so, the game play system and the game play methods allow for a user to purchase a game play or lottery wager at the payment-enabled terminal by receiving the request from the user, provisioning various game play regulations to determine whether the request is valid, effecting the financial transaction associated with the game play purchase, providing information related to the game play purchase to the user, effecting various automatic redemption processes, notifying the user about winning plays, etc. Various aspects, features, and functionality of the game play system and the game play methods are discussed in further detail in commonly-assigned U.S. patent application and Provisional patent application Ser. Nos. 11/734,207, 13/280,196, 61/593,762, 61/696,533, 13/757,512, and 13/829,776, which are each herein incorporated by reference for all purposes.

FIG. 1A is a schematic diagram illustrating a game play system 100 for facilitating a game play purchase by a user at a payment-enabled terminal 103. The payment-enabled terminal 103 may include a user interface 107, swipe 105, a pin pad (not shown), or various peripherals. In an embodiment, the user interface 107 is a touch screen.

The game play system 100 includes a game play data center 110 having a game play transaction database 112 for storing game play records 114 and one or more game play transaction processing servers 116 in communication with the transaction database 112. The game play data center 110 is in communication with a gaming operator 120 having one or more gaming operator servers 126. The gaming operator servers 126 are operable to generate game play number sets, and the transaction processing server 116 receives a game play number set for a given game play transaction from the gaming operator 120. In an embodiment, the gaming operator is part of the game play system 100, and includes one or more gaming operator servers 126 in communication with the game play transaction processing servers 116 over an intersystem network 117. In another embodiment, the gaming operator is located remotely from the game play system 100 and is in communication with the game play transaction processing servers 116 over a secure network connection 119. In either embodiment, the game play transaction processing servers 116 are operable to receive information from the gaming operator 120 and/or gaming operator servers 126 relating to a game play transaction.

In some embodiments, the game play system 100 further comprises a game play system payment processor 118 in communication with the game play data center 110. The game play system payment processor 118 may conduct a financial transaction associated with the game play purchase independent of a financial payment processor 130, upon receiving communications from the game play transaction processing servers 116 to that effect. In other embodiments, the game play system 100 communicates with the financial payment processor 130 to initiate a financial transaction associated with the game play purchase.

Still referring to FIG. 1A, the game play system 100 may be in communication with a payment-enabled terminal 103, a media server 160, an electronic payment host 140, and/or a financial payment processor 130. The electronic payment host 140 may include a payment host 142 and/or a payment network data center 144. The media server 160 may include a media host 162 and/or a payment host 164.

For example, in an embodiment, the payment-enabled terminal 103 may be a fuel pump payment interface in communication with a local point of sale terminal (not shown), and the electronic payment host 140 may be a point of sale host. In an alternative embodiment, the payment-enabled terminal 103 may be a fuel pump interface in communication with the media server 160. The media server 160 may further be in communication with the electronic payment host 140 and/or may be in communication with the financial payment processor 130. As another example, in an embodiment, the payment-enabled terminal 103 may be an in-lane grocery point of sale terminal, and the electronic payment host 140 may be an electronic payment system host associated with the in-lane grocery point of sale system. As another example, in an embodiment, the payment-enabled terminal 103 may be a self-serve grocery kiosk in connection with a grocery local point of sale terminal, and the electronic payment host 140 may be an electronic payment system host associated with the grocery store local point of sale terminal. As another example, in an embodiment, the payment-enabled terminal 103 may be a swipe-enabled electronic tablet in communication with a local electronic tablet payment system server, and the electronic payment host 140 may be a gateway associated with the local electronic tablet payment system server.

Other interfaces and connectivity with fuel pump systems, grocery payment systems, and electronic tablet payment systems are also further described below, and the game play system may bypass an electronic payment host 140 in certain embodiments. Indeed, any payment-enabled device 103 that includes a user interface 107 and a mechanism for determining a payment card number, that is connected, generally speaking, to a payment network, may communicate with the game play system 100. Game play purchases are, thus, possible through a variety of payment-enabled devices 103.

The game play transaction processing servers 116 may receive a payment card number associated with the user 101. The payment card number originates at the payment-enabled terminal 103 and is identified when the user 101 swipes its payment card at the payment-enabled terminal 103 or when the payment card number is otherwise determined (e.g., through a mobile "tap" or NFC communication) at the payment-enabled terminal 103. The game play transaction processing servers 116 may also associate the payment card number with a game play number set received from a gaming operator 120. The game play transaction processing servers 116 may communicate the payment card number and game play number set to the transaction database 112 for storage in records 114.

Still referring to FIG. 1A, the game play system 100 is operable to effect ticketless game plays by associating the user's payment card number with a game play number set. For example, the game play transaction database 112 may store a plurality of records 114 of game play number sets associated with respective payment card numbers. The game play transaction processing servers 116 may manage ticketless lottery transactions by associating, storing, and referencing the plurality of records 114 of game play number sets and their respective payment card numbers. The game play system 100 is also operable to effect automatic winner redemption by initiating payment to an account tied to a payment card number associated with a winning game play number set. The game play system 100 may also manage second chance game plays based on the plurality of records 114 of game play number sets associated with respective payment card numbers stored at the transaction database 112. For example, the game play system 100 may reference the plurality of records 114 to identify non-winning game play number sets. The game play system 100 may then use a random number generator (or other game play mechanism) to run a second chance play for the users associated with the non-winning game play number sets. The "winnings" for the second chance game play may include, but is not limited to, a game play, a store promotion, or free merchandise. For example, if a user purchased the game play at a payment-enabled terminal associated with a particular store, then the game play system may manage and run second chance game plays for that store, and "winnings" for the second chance game play may include a store promotion for that store.

A user 101 of the game play system 100 may use a credit card or debit card to conduct the game play purchase. Thus, the payment card number may be a credit card number or a debit card number.

Figure 1B:
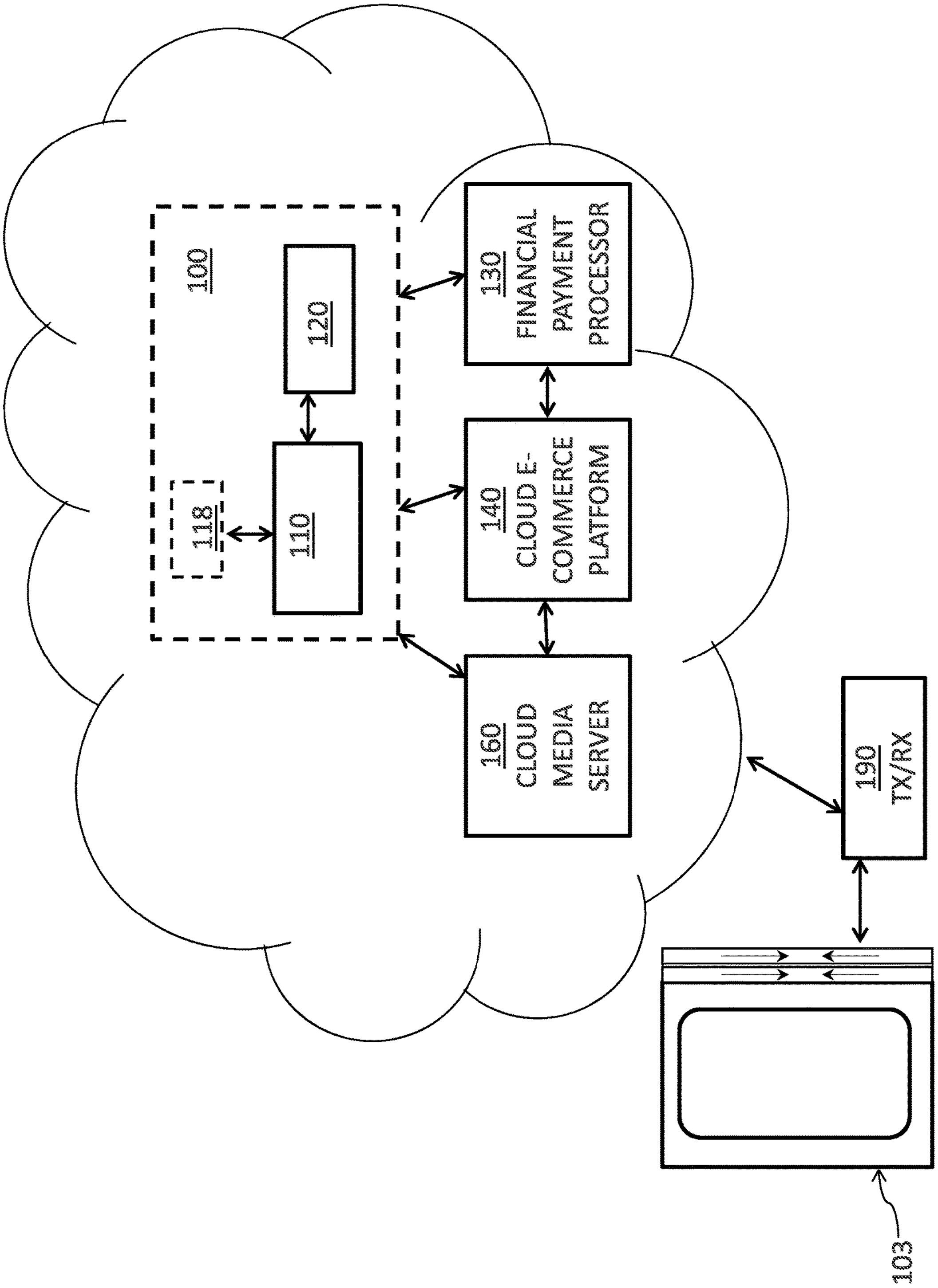
FIG. 1B is a schematic diagram illustrating a game play system, in accordance with the present disclosure.

Further, the connections between the various system elements may be wired or wireless, and may also be cloud-based communications. For example, in an embodiment shown in FIG. 1B, the game play system 100 is in communication with a cloud media server 160, cloud e-commerce platform 140, and/or a cloud based financial payment processor 130. The game play system 100 may also be cloud-based. A transmitter-receiver 190 associated with the payment-enabled terminal 103 may communicate with the various systems 100, 160, 140, and/or 130. Thus, the payment-enabled terminal 103 may receive communications, instructions, data, content for display at the payment-enabled terminal 103 over the cloud from the game play system 100.

Referring back to FIG. 1A, the transaction database 112 is further operable to store one or more sets of gaming rules associated with respective jurisdictions, and the transaction processing servers 116 are operable to provision the gaming rules for a given game play purchase. The game play transaction processing servers 116 may further lookup a payment card number in the game play transaction database to determine the eligible lottery transactions associated with the payment card number. The transaction processing servers 116 may provision the gaming rules based a user's age, based on payment card limits, based on responsible game play restrictions, draw break buffers, and/or based on other time and day restrictions. In some embodiments, the remote system associated with the payment-enabled terminal 103 (or the payment-enabled terminal itself) may provision all or a portion of the gaming rules for the game play purchase in cooperation with the transaction processing servers 116. The game play system 100 may provide instructions for the provisioning of all or a portion of the gaming rules to the remote system associated with the payment-enabled terminal 103 (or to the payment-enabled terminal itself) substantially in real-time. Thus, gaming rule provisioning may be conducted wholly at the game play system 100, wholly at the remote system associated with the payment-enabled terminal (or the payment-enabled terminal itself) in communication with the game play system 100, or at a combination of the game play system 100 and the remote system, depending on the payment-enabled terminal capability and the connection between the payment-enabled terminal 103 and the game play system 100. Further, the gaming provisioning may be done substantially in real-time, based on predetermined logic or rules that are regularly updated, or a combination of both, depending on the payment-enabled terminal capability and the connection between the payment-enabled terminal 103 and the game play system 100.

The game play system 100 may further direct or control the content displayed at a user interface 107 of the payment-enabled terminal 103. Generally speaking, the presentment of content displayed at the user interface 107 may be all or partially directed by the game play system 100, or may be all or partially directed by the remote system associated with the payment-enabled terminal 103, or may be a combination of remote system presentment of content and game play system 100 presentment of content, depending on the payment-enabled terminal capability and the connection between the payment-enabled terminal 103 and the game play system 100. Further, presenting content to the user at the payment-enabled terminal 103 may be done substantially in real-time, based on predetermined logic that is regularly updated, or a combination of both, depending on the payment-enabled terminal capability and the connection between the payment-enabled terminal 103 and the game play system 100.

In an embodiment, the game play system 100 stores user-specific administrative data, including, but not limited to, user preferences for presentment of data at the user interface 107, game play options, etc. In an embodiment, user-specific administrative data is stored in the game play transaction database 112 and is associated with respective payment card numbers, thereby allowing for the game play system 100 to control content at the payment-enabled terminal 103, on a user-specific basis, upon receipt of a payment card number. The game play system 100 may further be operable to manage the display of content at the payment-enabled terminal 103 based on the user-specific administrative data, depending on the payment-enabled terminal capability and the connection between the payment-enabled terminal 103 and the game play system 100.

Figure 2A:
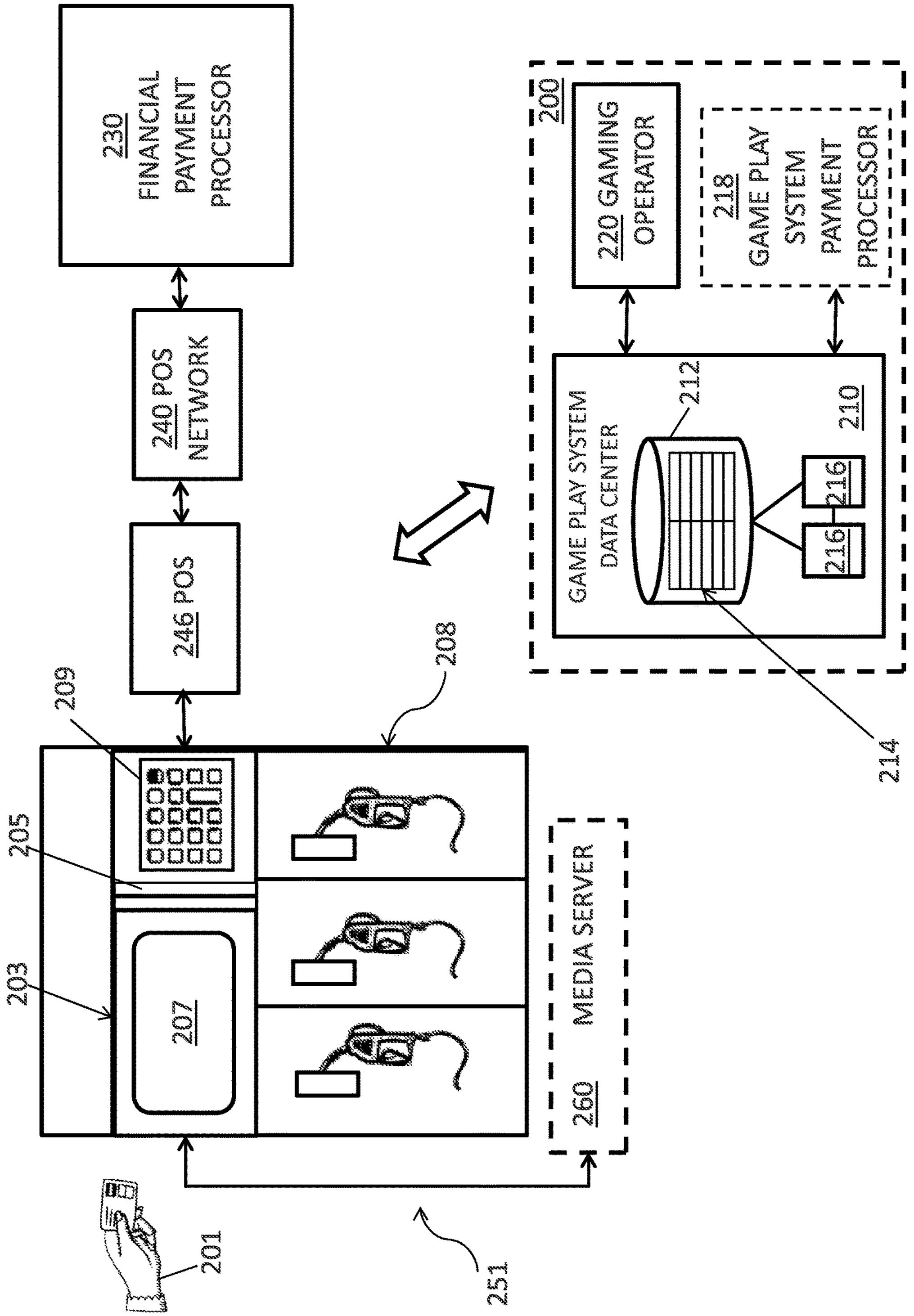
FIG. 2A is a schematic diagram illustrating a game play system in communication with a fuel payment system, in accordance with the present disclosure.

FIG. 2A is a schematic diagram illustrating a game play system 200 in communication with a fuel payment system 251. The game play system 200 may include a game play data center 210 having a game play transaction database 212 for storing game play records 214 and one or more game play transaction processing servers 216 in communication with the transaction database 212.

The game play data center 210 is in communication with a gaming operator 220 having one or more gaming operator servers (see, e.g., FIG. 1A). The gaming operator servers are operable to generate game play number sets, and the transaction processing server 216 receives a game play number set for a given game play transaction from the gaming operator 220. In an embodiment, the gaming operator is part of the game play system 200, and includes one or more gaming operator servers in communication with the game play transaction processing servers 216 over an intersystem network. In another embodiment, the gaming operator 220 is located remotely from the game play system 200 and is in communication with the game play transaction processing servers 216 over a secure network connection. In either embodiment, the game play transaction processing servers 216 are operable to receive information from the gaming operator 220 and/or gaming operator servers relating to a game play transaction.

In some embodiments, the game play system 200 further comprises a game play system payment processor 218 in communication with the game play data center 210. The game play system payment processor 218 may conduct a financial transaction associated with the game play purchase independent of the financial payment processor 230, upon receiving communications from the game play transaction processing servers 216 to that effect. In other embodiments, the game play system 200 communicates with the financial payment processor 230 to initiate a financial transaction associated with the game play purchase.

The fuel payment system may include a fuel pump 208, a local point of sale terminal 246, a point of sale host network 240, media server 260, and/or a financial payment processor 230. The game play system 200 may be in communication with the fuel pump 208, local point of sale terminal 246, media server 260, point of sale host network 240, and/or financial payment processor 230 directly or indirectly through communication servers, gateways, or other hosts. Thus, the transaction processing server 216 of the game play system 200 may receive the payment card number from a several parts of the fuel pump system 251. The fuel pump 208 may include a payment-enabled terminal 203, which may include a user interface 207 for interacting with a user 201, a swipe 205 for reading a user payment card, and/or a pin pad 209. In alternative embodiments, the payment-enabled terminal may include other kinds of swipe-enabled terminals, swipe-enabled point of sale (POS) systems, Card Reader in Dispenser terminals (CRIND terminals), payment-enabled "smart" devices (e.g., tablets, netbooks, mobile devices, etc.), payment kiosks, self-service payment terminals, automated teller machines (ATMs), "tap" payment platforms, near-field communication payment platforms, proximity-based communication payment platforms, barcode scan payment platforms, cloud-enabled payment devices and interfaces, and cloud-enabled point of sale platforms. Thus, the payment card number may be identified when the user 201 swipes its payment card at the fuel pump payment-enabled terminal 203 or when a payment card number is otherwise determined (e.g., via "tap" of a mobile device or NFC communication) at the payment-enabled terminal 203. In an embodiment, the user interface 207 comprises a media screen. The user interface (media screen) 207 may display media content guiding the user 201 through a game play purchase.

As discussed above in relation to FIGS. 1A and 1B, gaming rule provisioning may be conducted wholly at the game play system 200, wholly at the fuel payment system 251 associated with the payment-enabled terminal 203 (or the payment-enabled terminal 203 itself), or at a combination of the game play system 200 and the fuel payment system 251. Further, the gaming provisioning may be done substantially in real-time, based on predetermined logic or rules that are regularly updated, or a combination of both. The game play system 200 may further direct or control the content displayed at a user interface 207 of the payment-enabled terminal 203. Generally speaking, the presentment of content displayed at the user interface 207 may be all or partially directed by the game play system 200, or may be all or partially directed by the fuel payment system 251 associated with the payment-enabled terminal 203, or may be a combination of fuel payment system 251 presentment of content and game play system 200 presentment of content. Further, presenting content to the user at the payment-enabled terminal 203 may be done substantially in real-time, based on predetermined logic that is regularly updated, or a combination of both.

Figure 2B:
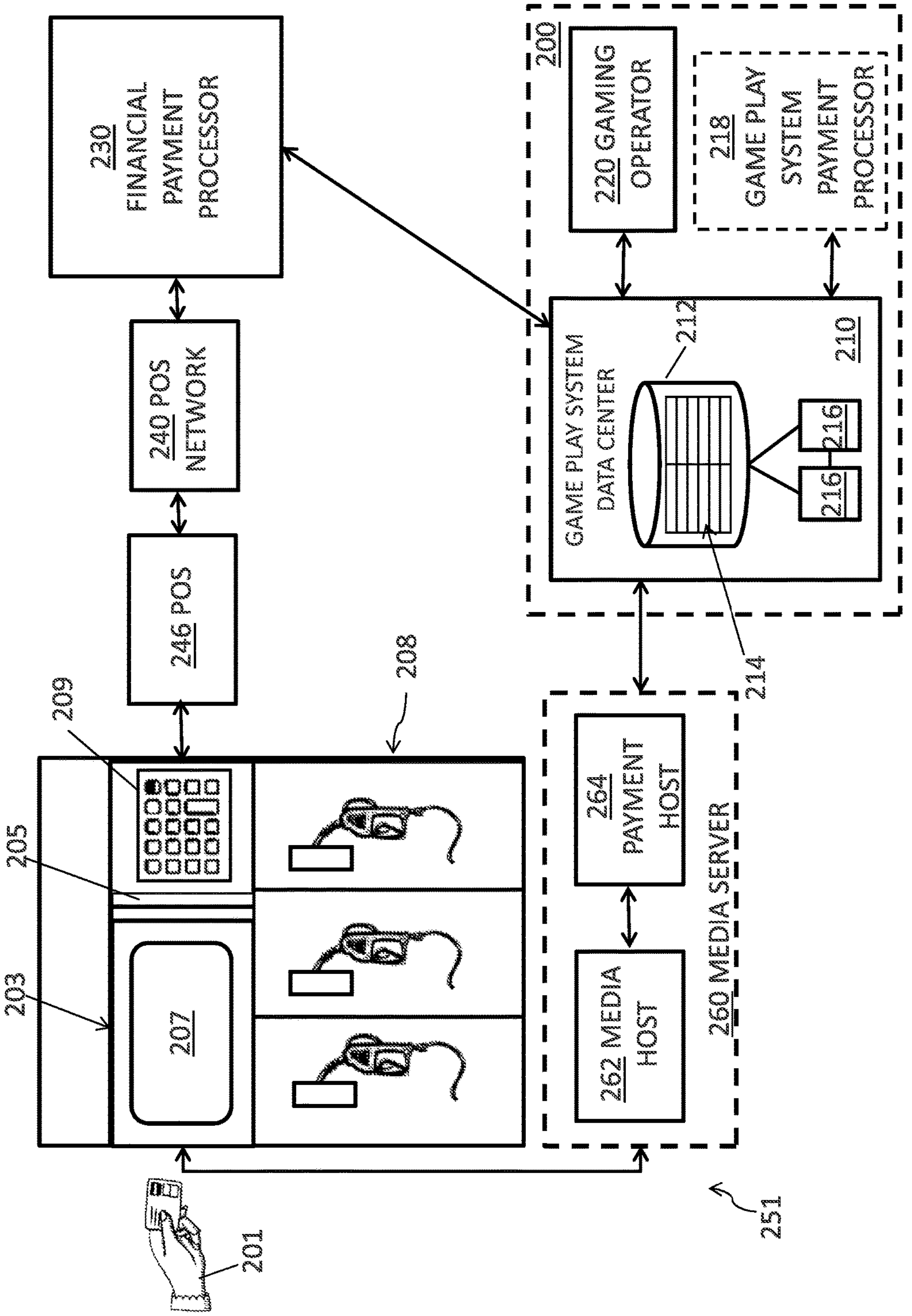
FIG. 2B is a schematic diagram illustrating a game play system in communication with a fuel pump system, in accordance with the present disclosure.

FIG. 2B is a schematic diagram illustrating a game play system 200 in communication with an embodiment of a fuel pump system 251. The fuel pump system 251 includes a fuel pump 208, a local point of sale terminal 246, a point of sale host network 240, and a financial payment processor 230. The fuel pump 208 is in communication with the local point of sale terminal 246, which is in communication with the point of sale host network 240, which communicates with the financial payment processor 230 to effect a fuel pump payment transaction. The fuel pump system 251 further includes a media-enabled electronic payment system 261. The media-enabled electronic payment system 261 controls the user interface 207 to conduct a payment transaction and/or to display media content. In this embodiment, the user interface 207 is a media screen. The media-enabled electronic payment system 261 includes a media host 262 in communication with a payment host 264. The media host 262 displays and controls the media content presented to the user 201 and also receives user inputs from the swipe 205, pin pad 209, and the user interface 208, and the payment host 264 effects a payment transaction.

The game play system 200 may communicate with the media server 260 to effect a game play purchase. The game play system 200 is communication with the payment host 264 of the media payment system 260. The payment host 264 is in communication with the transaction processing server 216. Thus, the transaction processing server 216 of the game play system 200 may receive the payment card number from the payment host 264 of the media payment system 260.

Further, gaming rule provisioning may be conducted wholly at the game play system 200, wholly at the media server 260, or at a combination of the game play system 200 and the media server 260. Further, the gaming provisioning may be done substantially in real-time, based on predetermined logic or rules that are regularly updated, or a combination of both. The game play system 200 may further direct or control the content displayed at a user interface 207 of the payment-enabled terminal 203 through the media server 260. Generally speaking, the presentment of content displayed at the user interface 207 may be all or partially directed by the game play system 200, or may be all or partially directed by the media server 260 associated with the payment-enabled terminal 203, or may be a combination of media server 260 presentment of content and game play system 200 presentment of content. Further, presenting content to the user at the payment-enabled terminal 203 may be done substantially in real-time, based on predetermined logic that is regularly updated, or a combination of both.

Figure 2C:
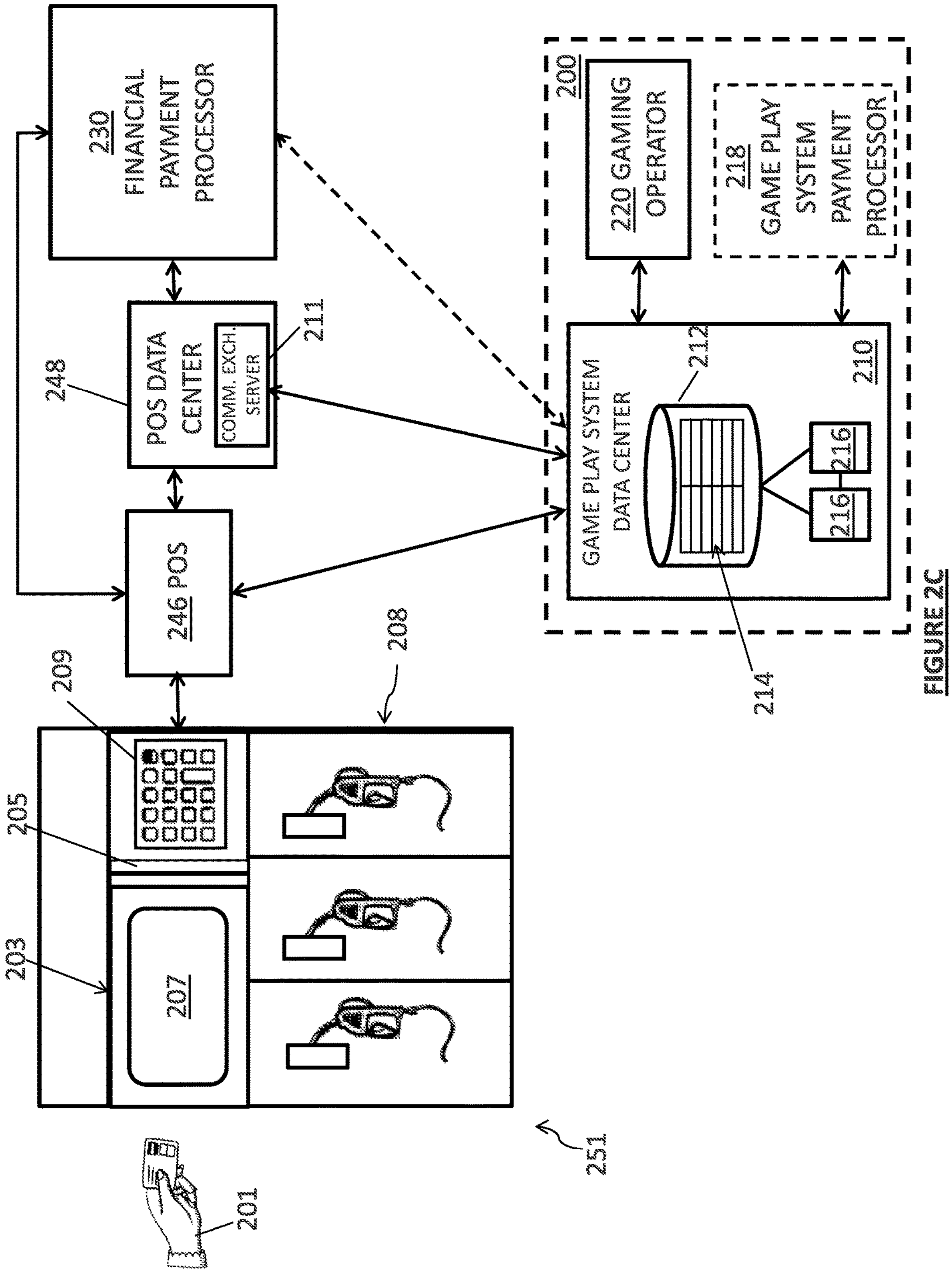
FIG. 2C is a schematic diagram illustrating a game play system in communication with a fuel pump system, in accordance with the present disclosure.

FIG. 2C is a schematic diagram illustrating a game play system in communication with another embodiment of a fuel pump system 251. The fuel pump system 251 may include a fuel pump 208, a local point of sale terminal 246, a point of sale data center 248, and a financial payment processor 230 to effect a fuel pump payment transaction. In some embodiments, the point of sale terminal 246 is in direct communication with the financial payment processor 230, bypassing a point of sale data center 248, to effect the transaction. In such an embodiment, the game play system 200 receives the payment card number from the point of sale terminal 246 associated with the fuel pump 208 or the financial payment processor 230. Accordingly, the game play transaction server may receive the payment card number from the point of sale terminal 246 or the financial payment processor 230.

In other embodiments, the fuel pump 208 is in communication with the local point of sale terminal 246, which is in communication with the point of sale data center 248, which communicates with the financial payment processor 230 to effect a fuel pump payment transaction. The point of sale data center 248 may include a point of sale host (not shown) and a communications exchange server 211. In such embodiments, the game play system 200 receives the payment card number from the communications exchange server 211 located at a point of sale data center 248. Accordingly, the game play transaction server may receive the payment card number from the communications exchange server 211.

Thus game play system 200 may communicate with the point of sale terminal 246, the financial payment processor 230, and/or the communications exchange server 211 to effect a game play purchase. The game play system 200 may also communicate with the financial payment processor 230 or the game play system payment processor 218 to effect the game play purchase transaction.

Further, gaming rule provisioning may be conducted wholly at the game play system 200; at one or more of the POS 246, communication exchange server 211, and financial payment processor 230; or at a combination of the game play system 200 and one or more of the POS 246, communication exchange server 211, and financial payment processor 230. Further, the gaming provisioning may be done substantially in real-time, based on predetermined logic or rules that are regularly updated, or a combination of both. The game play system 200 may further direct or control the content displayed at a user interface 207 of the payment-enabled terminal 203 through one or more of the POS 246, communication exchange server 211, and financial payment processor 230. Generally speaking, the presentment of content displayed at the user interface 207 may be all or partially directed by the game play system 200, or may be all or partially directed by one or more of the POS 246, communication exchange server 211, and financial payment processor 230 associated with the payment-enabled terminal 203, or may be a combination of one or more of the POS 246, communication exchange server 211, and financial payment processor 230 presentment of content and game play system 200 presentment of content. Further, presenting content to the user at the payment-enabled terminal 203 may be done substantially in real-time, based on predetermined logic that is regularly updated, or a combination of both.

Figure 2D:
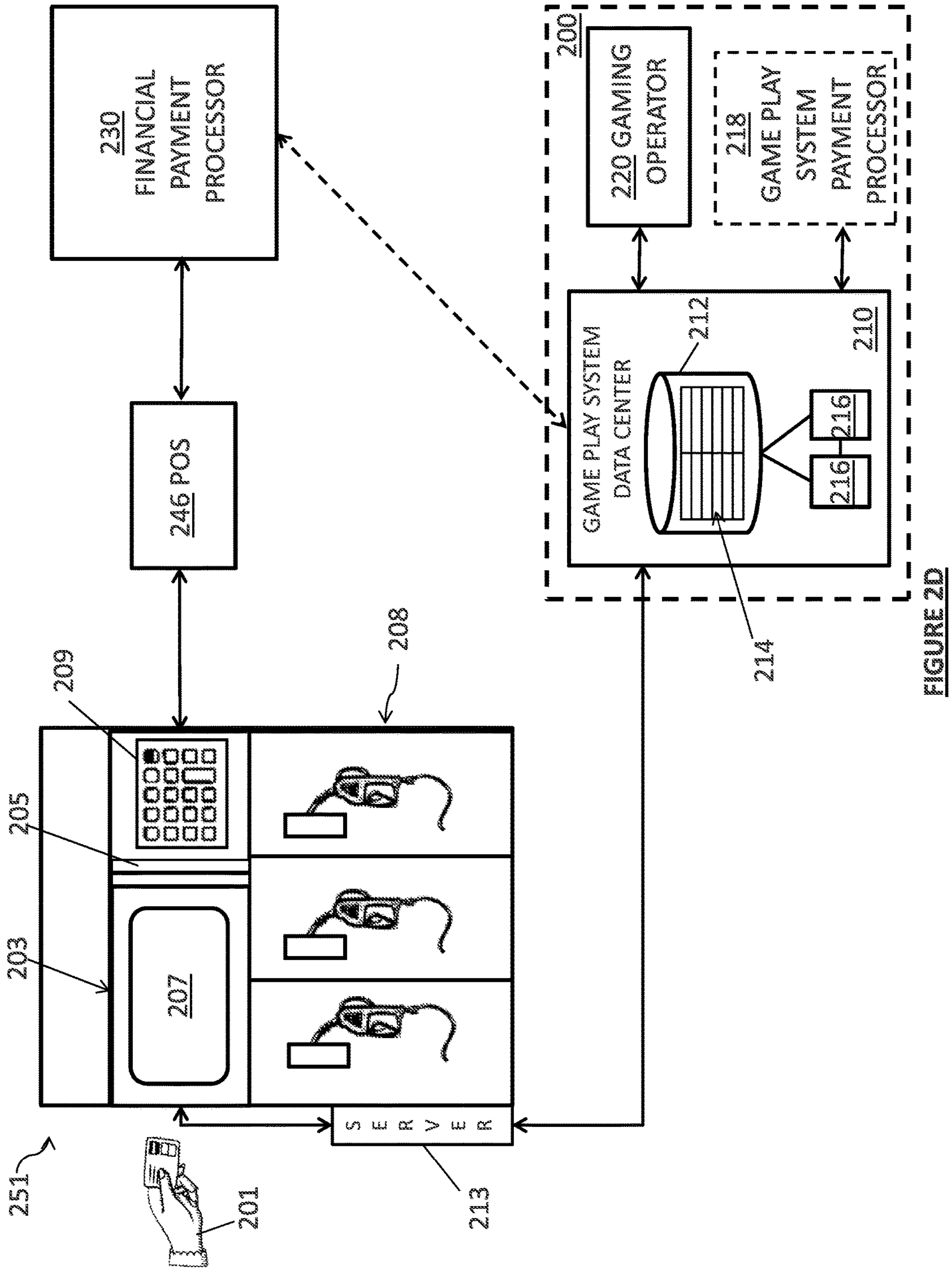
FIG. 2D is a schematic diagram illustrating a game play system in communication with a fuel pump system, in accordance with the present disclosure.

FIG. 2D is a schematic diagram illustrating a game play system 200 in communication with another embodiment of a fuel pump system 251. The fuel pump system 251 may include a fuel pump 208, a local point of sale terminal 246, and a financial payment processor 230 to effect a fuel pump payment transaction. The fuel pump may also include a fuel pump server 213 in communication with the user interface 207. In this embodiment, the user interface is a media screen, and the media server 213 is operable to control display of media content at the media screen and to receive user inputs at the screen 207, swipe 205, and/or pin pad 209. The game play system 200 receives the payment card number from the fuel pump server 213 of the gas pump 208. In particular, the game play transaction server 216 may receive the payment card number from the fuel pump server 213.

Thus game play system 200 may communicate with the fuel pump server 213 to effect a game play purchase. The game play system 200 may also communicate with the financial payment processor 230 or the game play system payment processor 218 to effect the game play purchase transaction.

Further, gaming rule provisioning may be conducted wholly at the game play system 200, wholly at the fuel pump server 213, or at a combination of the game play system 200 and the media server 260. Further, the gaming provisioning may be done substantially in real-time, based on predetermined logic or rules that are regularly updated, or a combination of both. The game play system 200 may further direct or control the content displayed at a user interface 207 of the payment-enabled terminal 203 through the fuel pump server 213. Generally speaking, the presentment of content displayed at the user interface 207 may be all or partially directed by the game play system 200, or may be all or partially directed by the media server 260 associated with the payment-enabled terminal 203, or may be a combination of fuel pump server 213 presentment of content and game play system 200 presentment of content. Further, presenting content to the user at the payment-enabled terminal 203 may be done substantially in real-time, based on predetermined logic that is regularly updated, or a combination of both.

Figure 2E:
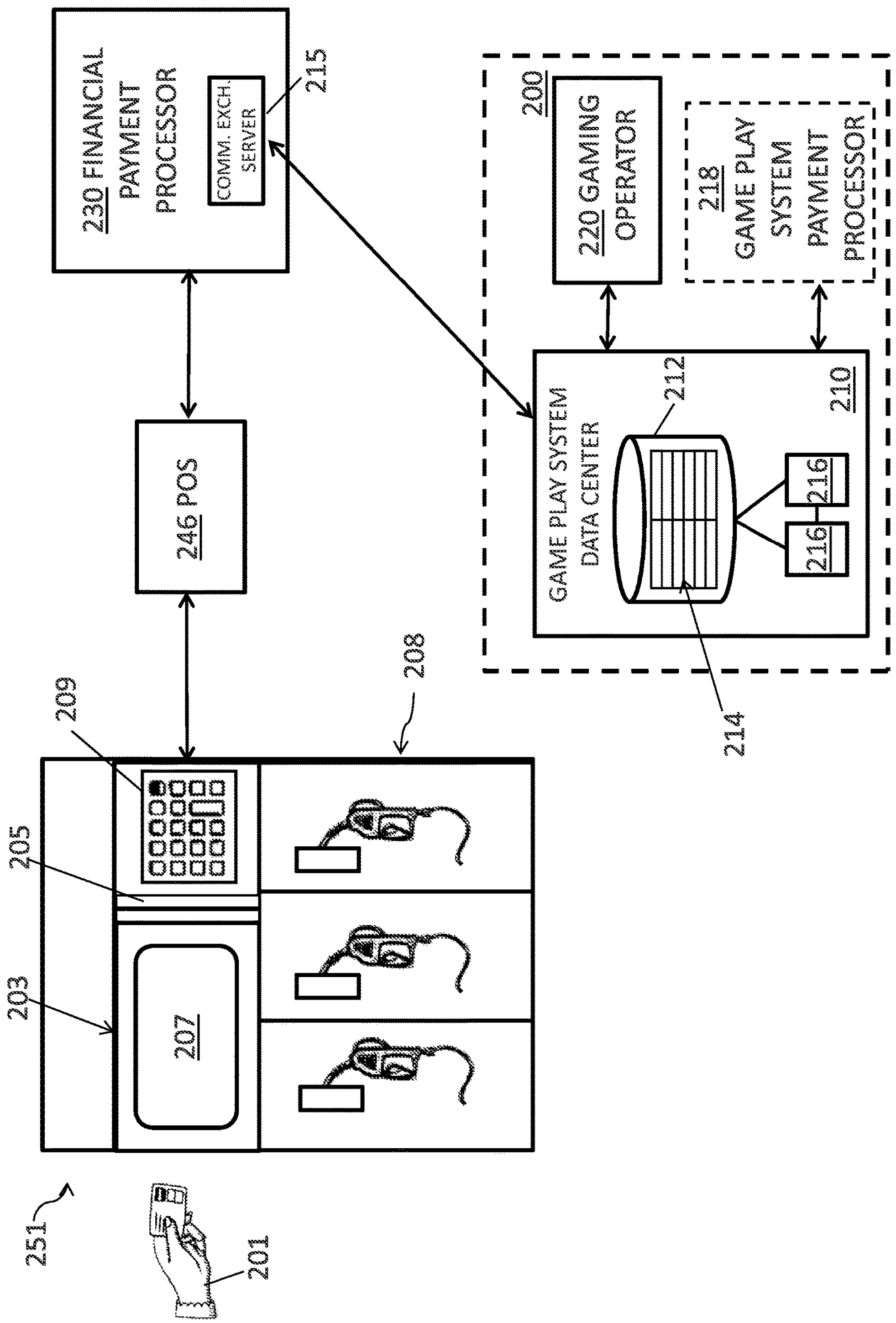
FIG. 2E is a schematic diagram illustrating a game play system in communication with a fuel pump system, in accordance with the present disclosure.

FIG. 2E is a schematic diagram illustrating a game play system 200 in communication with another embodiment of a fuel pump system 251. The fuel pump system 251 may include a fuel pump 208, a local point of sale terminal 246, and a financial payment processor 230 to effect a fuel pump payment transaction. The financial payment processor may include a communications exchange server 215 in communication with the game play system 200. The communications exchange server 215 receives the user's payment card number from the point of sale terminal 246, which receives the user's payment card number from the payment-enabled terminal 203. The game play system 200 receives the payment card number from the communications exchange server 215 of the financial payment processor 230. In particular, the game play transaction server 216 may receive the payment card number from the communications exchange server 215 of the financial payment processor 230.

Thus game play system 200 may communicate with the communications exchange server 215 of the financial payment processor 230 to effect a game play purchase. The game play system 200 may also communicate with the financial payment processor 230 or the game play system payment processor 218 to effect the game play purchase transaction.

Further, gaming rule provisioning may be conducted wholly at the game play system 200, wholly at the communications exchange server 215, or at a combination of the game play system 200 and the media server 260. Further, the gaming provisioning may be done substantially in real-time, based on predetermined logic or rules that are regularly updated, or a combination of both. The game play system 200 may further direct or control the content displayed at a user interface 207 of the payment-enabled terminal 203 through the communications exchange server 215. Generally speaking, the presentment of content displayed at the user interface 207 may be all or partially directed by the game play system 200, or may be all or partially directed by the media server 260 associated with the payment-enabled terminal 203, or may be a combination of communications exchange server 215 presentment of content and game play system 200 presentment of content. Further, presenting content to the user at the payment-enabled terminal 203 may be done substantially in real-time, based on predetermined logic that is regularly updated, or a combination of both.

Figure 2F:
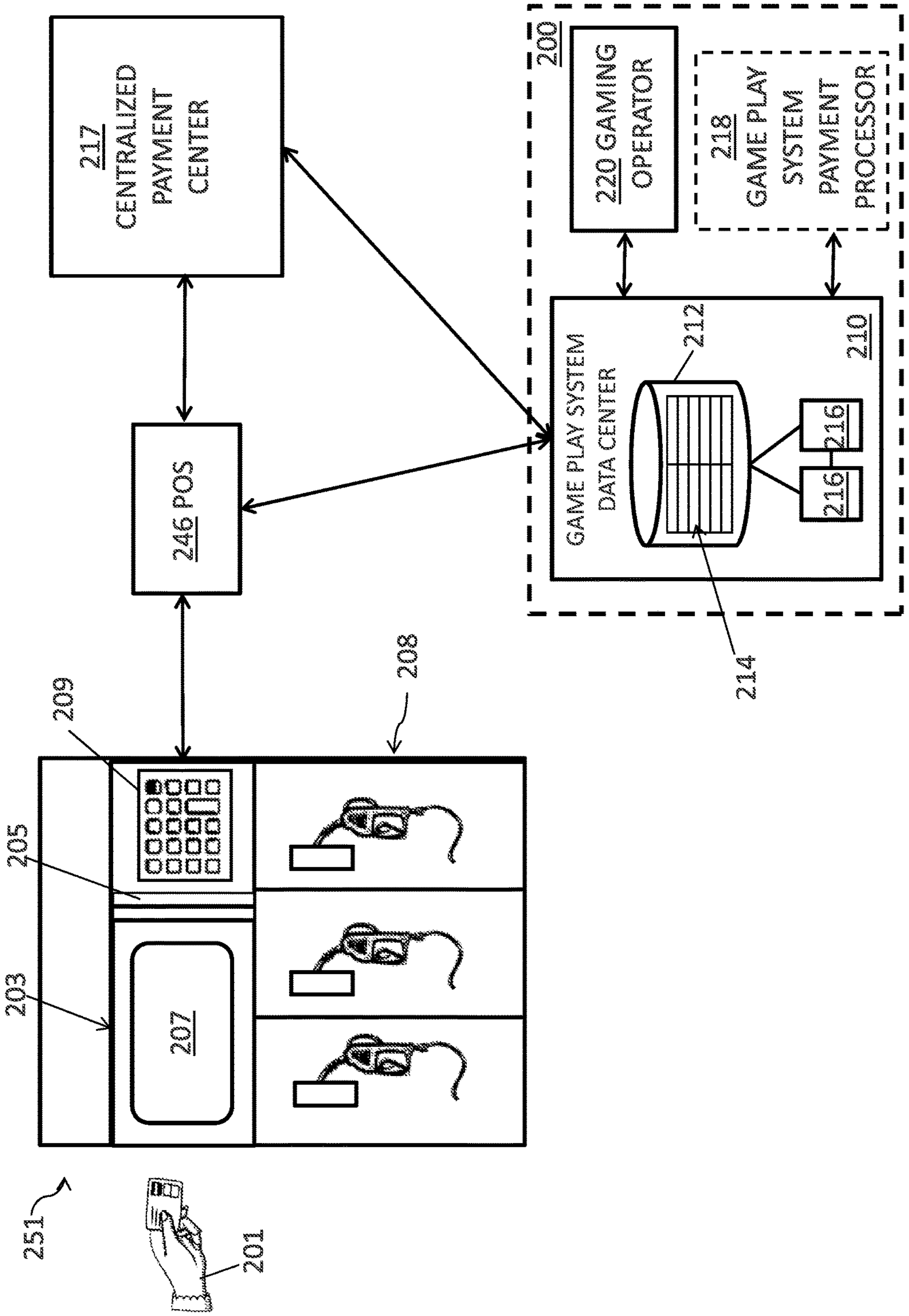
FIG. 2F is a schematic diagram illustrating a game play system in communication with a fuel pump system, in accordance with the present disclosure.

FIG. 2F is a schematic diagram illustrating a game play system 200 in communication with another embodiment of a fuel pump system 251. The fuel pump system 251 may include a fuel pump 208, a local point of sale terminal 246, and a centralized payment system 217 to effect a fuel pump payment transaction. The centralized payment system 217 may include a financial payment data center associated with the fuel pump system and a financial payment processor. The centralized payment system 217 is in communication with the game play system 200. The centralized payment system 217 receives the user's payment card number from the point of sale terminal 246, which receives the user's payment card number from the payment-enabled terminal 203. The game play system 200 receives the payment card number from the centralized payment system 217. In particular, the game play transaction server 216 may receive the payment card number from the centralized payment system 217.

Thus game play system 200 may communicate with the centralized payment system 217 of the financial payment processor 230 to effect a game play purchase. The game play system 200 may also communicate with the centralized payment system 217 or the game play system payment processor 218 to effect the game play purchase transaction.

Further, gaming rule provisioning may be conducted wholly at the game play system 200, wholly at the centralized payment system 217, or at a combination of the game play system 200 and the centralized payment system 217. Further, the gaming provisioning may be done substantially in real-time, based on predetermined logic or rules that are regularly updated, or a combination of both. The game play system 200 may further direct or control the content displayed at a user interface 207 of the payment-enabled terminal 203 through the centralized payment system 217. Generally speaking, the presentment of content displayed at the user interface 207 may be all or partially directed by the game play system 200, or may be all or partially directed by the centralized payment system 217 associated with the payment-enabled terminal 203, or may be a combination of centralized payment system 217 presentment of content and game play system 200 presentment of content. Further, presenting content to the user at the payment-enabled terminal 203 may be done substantially in real-time, based on predetermined logic that is regularly updated, or a combination of both.

Figure 2G:
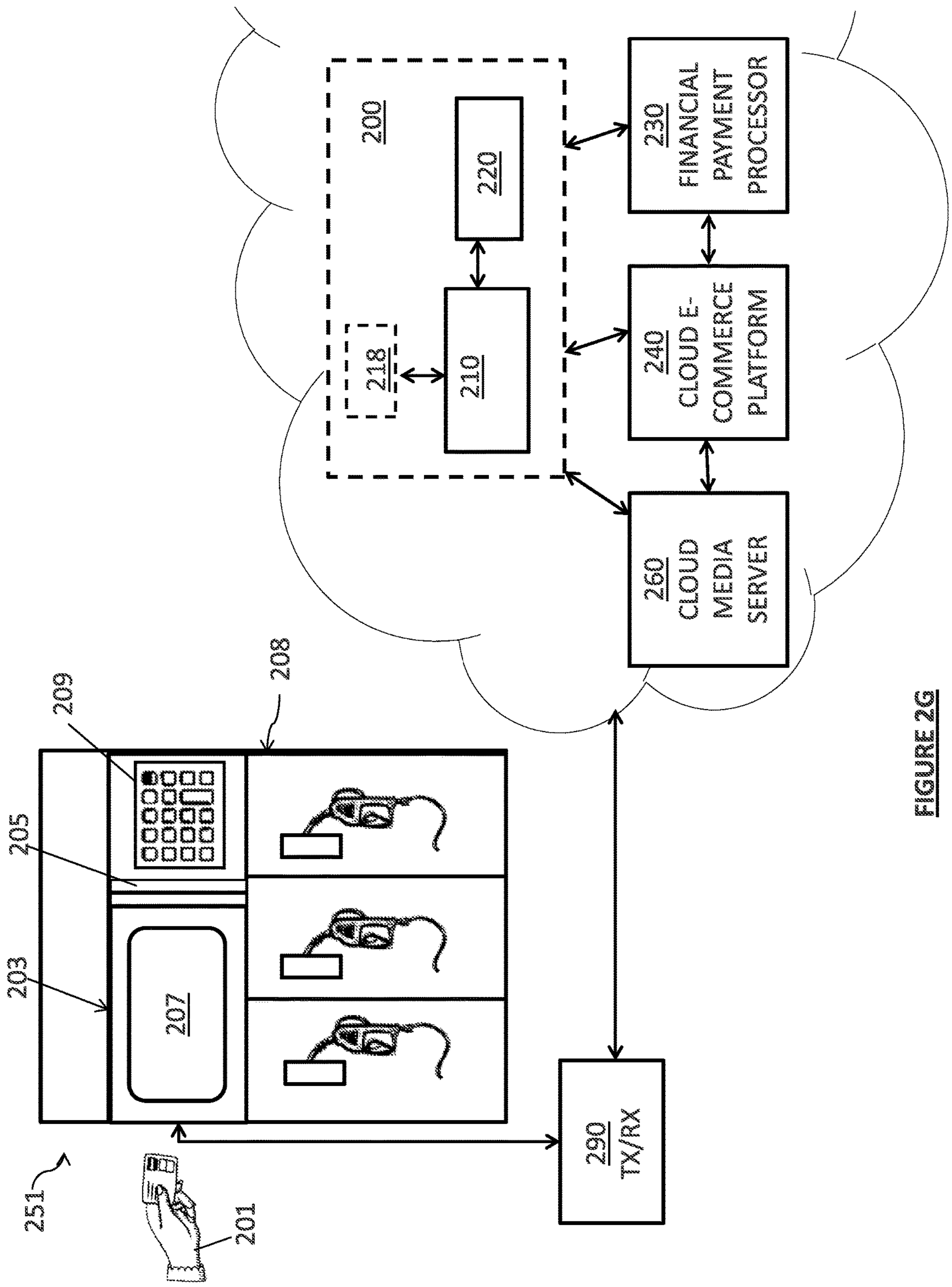
FIG. 2G is a schematic diagram illustrating a game play system in communication with a fuel pump system, in accordance with the present disclosure.

FIG. 2G is a schematic diagram illustrating a game play system 200 in communication with a cloud-based embodiment of a fuel pump system 251. The fuel pump system 251 may include a fuel pump 208 and a transmitter-receiver 290. The transmitter-receiver 290 may send and receive communications to and from a cloud-based media server 260, a cloud e-commerce platform 240, and a financial payment processor 230 to effect a fuel pump payment transaction. The transmitter-receiver 290 may further be in communication with the game play system 200. The game play system 200 may also be in communication with the cloud-based media server 260, the cloud e-commerce platform 240, and/or the financial payment processor 230.

The game play system 200 receives the payment card number from the transmitter-receiver 290 either directly or indirectly through one or more of the cloud media server 260, cloud e-commerce platform 240, and financial payment processor 230. Thus game play system 200 may communicate with the payment-enabled terminal 203 via the cloud to effect a game play purchase.

Figure 3A:
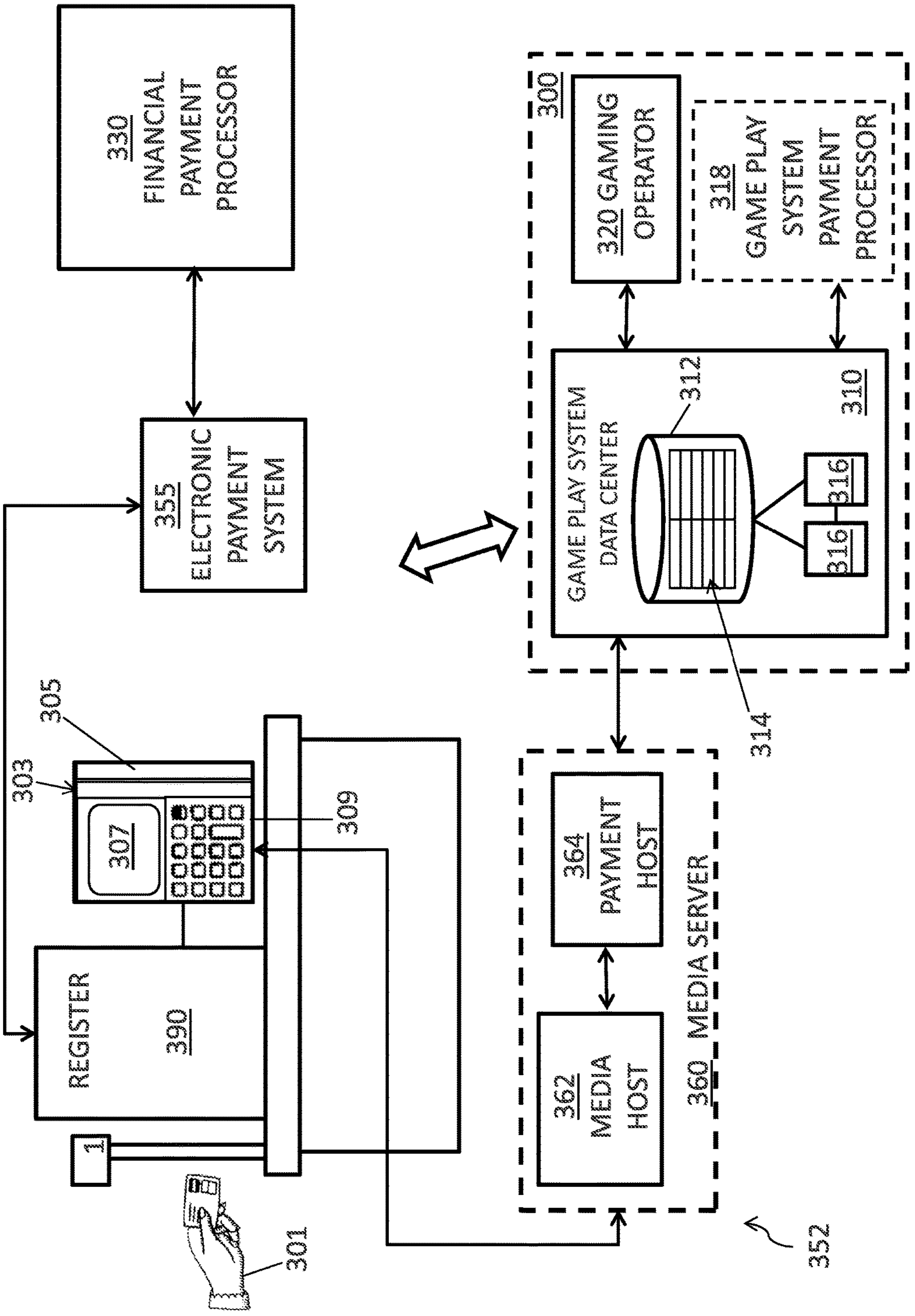
FIG. 3A is a schematic diagram illustrating a game play system in communication with a grocery payment system, in accordance with the present disclosure.

FIG. 3A is a schematic diagram illustrating a game play system 300 in communication with a grocery payment system 352. The game play system 300 may include a game play data center 310 having a game play transaction database 312 for storing game play records 314 and one or more game play transaction processing servers 316 in communication with the transaction database 312.

The game play data center 310 is in communication with a gaming operator 320 having one or more gaming operator servers (see, e.g., FIG. 1A). The gaming operator servers are operable to generate game play number sets, and the transaction processing server 316 receives a game play number set for a given game play transaction from the gaming operator 320. In an embodiment, the gaming operator is part of the game play system 300, and includes one or more gaming operator servers in communication with the game play transaction processing servers 316 over an intersystem network. In another embodiment, the gaming operator 320 is located remotely from the game play system 300 and is in communication with the game play transaction processing servers 316 over a secure network connection. In either embodiment, the game play transaction processing servers 316 are operable to receive information from the gaming operator 320 and/or gaming operator servers relating to a game play transaction.

In some embodiments, the game play system 300 further comprises a game play system payment processor 318 in communication with the game play data center 310. The game play system payment processor 318 may conduct a financial transaction associated with the game play purchase independent of the financial payment processor 330, upon receiving communications from the game play transaction processing servers 316 to that effect. In other embodiments, the game play system 300 communicates with the financial payment processor 330 to initiate a financial transaction associated with the game play purchase.

The grocery payment system may include a networked register 390, payment-enabled terminal 303, an electronic payment system 355, and a financial payment processor 330. The game play system 300 may be in communication with the networked register 390, media server 360, payment-enabled terminal 303, electronic payment system 355, and/or financial payment processor 330 directly or indirectly through communication servers, gateways, or other hosts. The media server 360 may include a media host 362 and/or a payment host 364.

Thus, the transaction processing server 316 of the game play system 300 may receive the payment card number from the grocery payment system 352. The payment-enabled terminal 303 may include a user interface 307 for interacting with a user 301 and swipe 305 for reading a user payment card. Thus, the payment card number may be identified when the user 301 swipes its payment card at the payment-enabled terminal 303, or when a payment card number is otherwise determined (e.g., via "tap" of a mobile device or NFC communication) at the payment-enabled terminal 303. In an embodiment, the payment-enabled terminal 303 is a local point of sale terminal in the grocery store. The point of sale terminal may further include a pin pad 309. In an embodiment, the user interface 307 comprises a media screen. The user interface (media screen) 307 may display media content guiding the user 301 through a game play purchase. The media server 360 may control or direct the display of media content at the user interface 307 and may also receive data and information input by the user 301 at the interface 307, pin pad 309, and/or swipe 305.

As discussed above in relation to FIGS. 1A and 1B, gaming rule provisioning may be conducted wholly at the game play system 300, wholly at the fuel payment system 352 associated with the payment-enabled terminal 303 (or the payment-enabled terminal 303 itself), or at a combination of the game play system 300 and the fuel payment system 352. Further, the gaming provisioning may be done substantially in real-time, based on predetermined logic or rules that are regularly updated, or a combination of both. The game play system 300 may further direct or control the content displayed at a user interface 307 of the payment-enabled terminal 303. Generally speaking, the presentment of content displayed at the user interface 307 may be all or partially directed by the game play system 300, or may be all or partially directed by the fuel payment system 352 associated with the payment-enabled terminal 303, or may be a combination of fuel payment system 352 presentment of content and game play system 300 presentment of content. Further, presenting content to the user at the payment-enabled terminal 303 may be done substantially in real-time, based on predetermined logic that is regularly updated, or a combination of both.

Figure 3B:
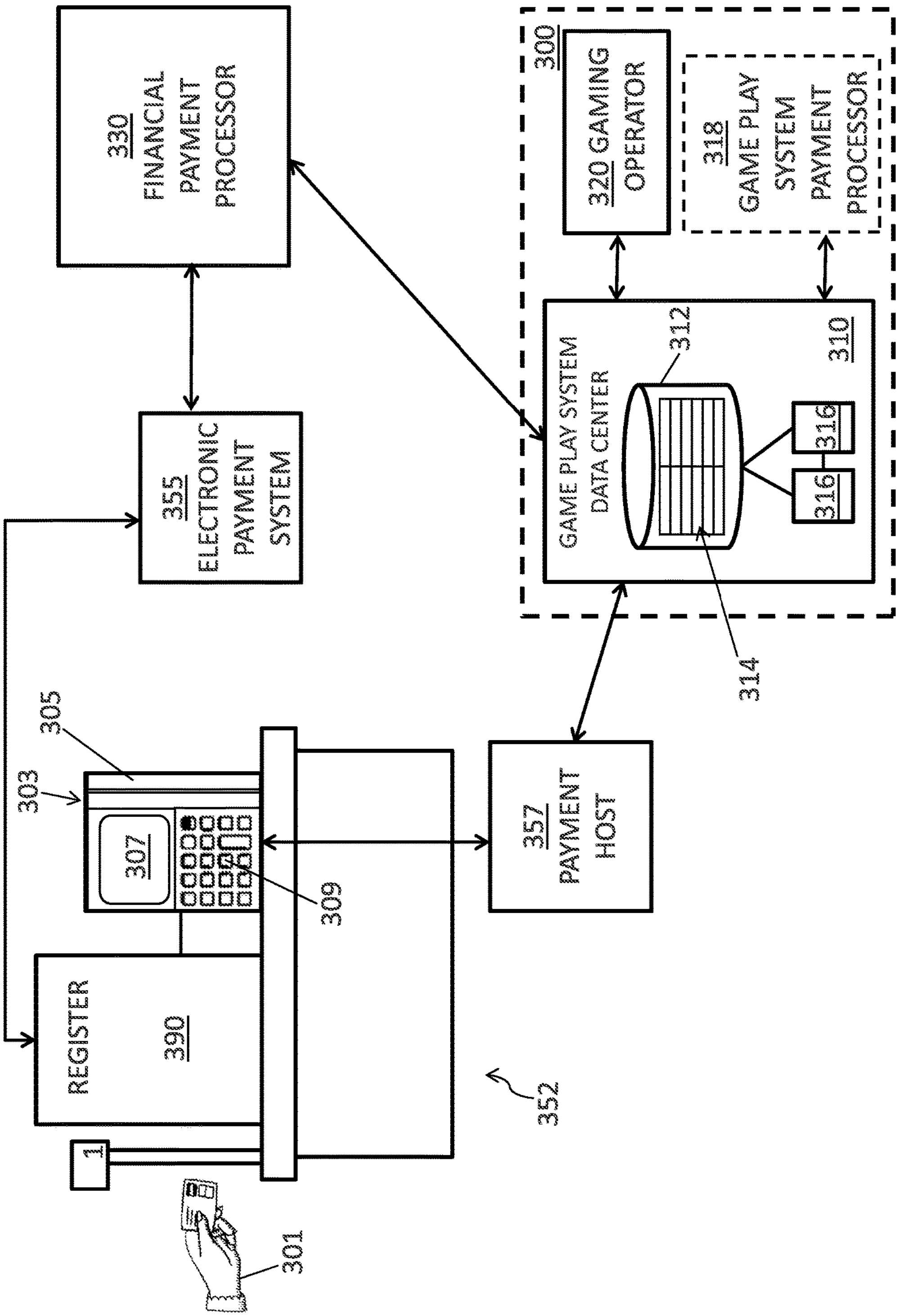
FIG. 3B is a schematic diagram illustrating a game play system in communication with a grocery payment system, in accordance with the present disclosure.

FIG. 3B is a schematic diagram illustrating a game play system 300 in communication with an embodiment of the grocery payment system 352. In embodiment, the grocery store payment system 352 is an in-lane grocery payment system.

The grocery payment system 352 includes a networked register 390, payment-enabled terminal 303, an electronic payment system 355, and a financial payment processor 330. The payment-enabled terminal 303 is in communication with an electronic payment system 355, which communicates with a financial payment processor 330. The grocery payment system 352 may further include a payment host 357 associated with the payment-enabled terminal 303. The payment host 357 may direct the display of transaction content on the user interface 307 of the payment-enabled terminal 303. In an embodiment, the user interface 307 is a media screen, and the host 357 directs the display of media transaction content on the media screen.

The game play system 300 may communicate with the payment host 357 to effect a game play purchase by the user 301. The game play system 300 may also communicate with the financial payment processor 330 or the game play system payment processor 318 to effect the game play purchase transaction. The game play system 300 is communication with the payment host 357. The payment host 357 is in communication with the transaction processing server 316. Thus, the transaction processing server 316 receives the payment card number from the payment host 357. The transaction processing server 316 also may provide instructions to the payment host 357 for directing the display of game-related content on the user interface 307.

Further, gaming rule provisioning may be conducted wholly at the game play system 300, wholly at the payment host 357, or at a combination of the game play system 300 and the payment host 357. Further, the gaming provisioning may be done substantially in real-time, based on predetermined logic or rules that are regularly updated, or a combination of both. The game play system 300 may further direct or control the content displayed at a user interface 307 of the payment-enabled terminal 303 through the payment host 357. Generally speaking, the presentment of content displayed at the user interface 307 may be all or partially directed by the game play system 300, or may be all or partially directed by the payment host 357 associated with the payment-enabled terminal 303, or may be a combination of payment host 357 presentment of content and game play system 300 presentment of content. Further, presenting content to the user at the payment-enabled terminal 303 may be done substantially in real-time, based on predetermined logic that is regularly updated, or a combination of both.

Figure 3C:
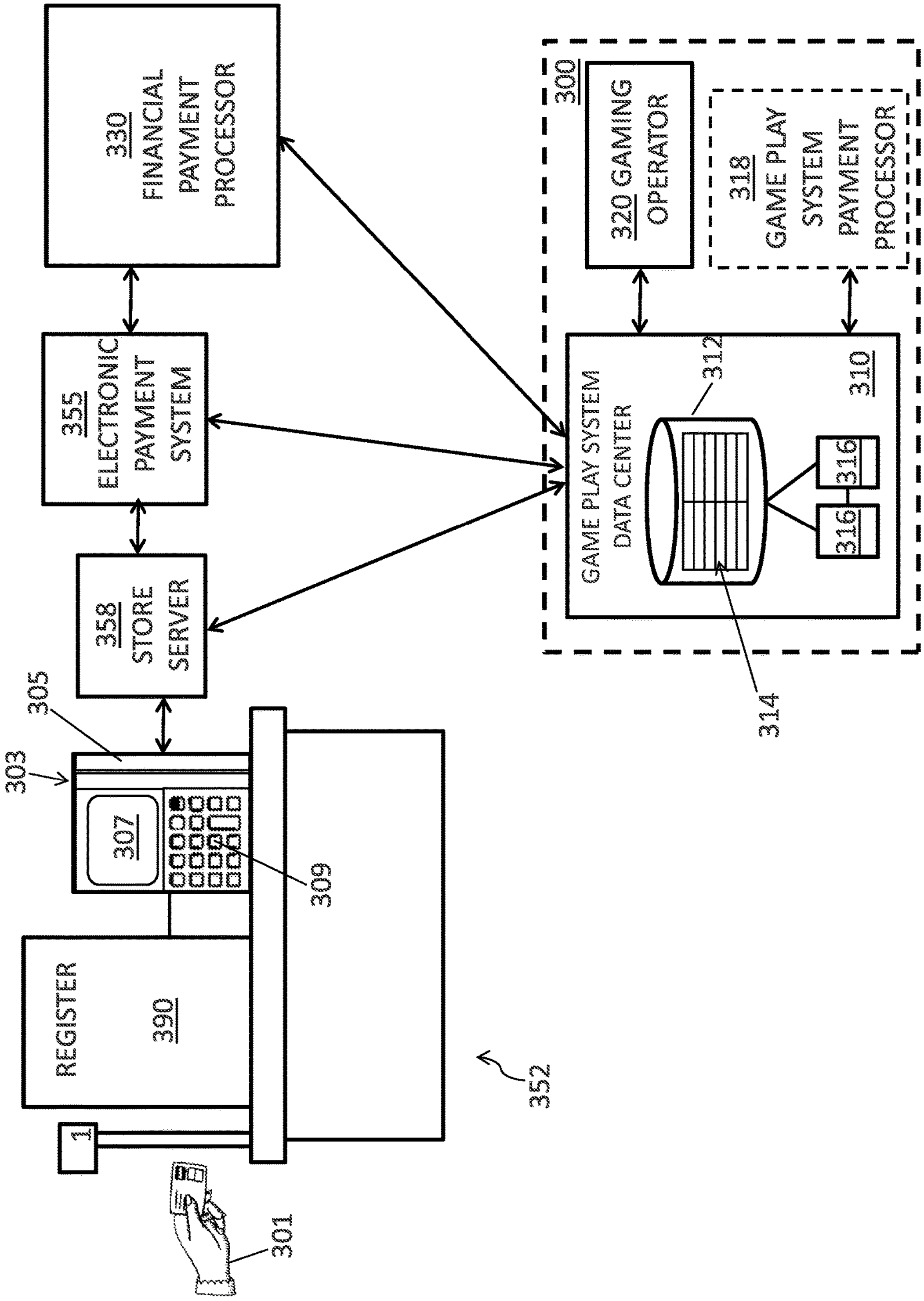
FIG. 3C is a schematic diagram illustrating a game play system in communication with a grocery payment system, in accordance with the present disclosure.

FIG. 3C is a schematic diagram illustrating a game play system 300 in communication with another embodiment of the grocery payment system 352. The grocery payment system 352 includes a networked register 390, payment-enabled terminal 303, a store server 358, an electronic payment system 355, and a financial payment processor 330. The payment-enabled terminal 303 is in communication with the store server 358, which communicates with an external electronic payment system 355, which communicates with a financial payment processor 330.

The game play system 300 may communicate with the in-store server 358 to effect a game play purchase by the user 301. In other embodiments, the game play system 300 may communicate with the electronic payment system 355 or the financial payment processor 330 to effect a game play purchase by the user 301. The game play system 300 may also communicate with the financial payment processor 330 or the game play system payment processor 318 to effect the game play purchase transaction. The game play system 300 is communication with the in-store server 358. The in-store server 358 is in communication with the transaction processing server 316. Thus, the transaction processing server 316 receives the payment card number from the in-store server 358. Alternatively, the game play system 300 may receive the payment card numbers from one or more of the electronic payment system 355 and the financial payment processor 330. The transaction processing server 316 also may provide instructions to the in-store server 358 for directing the display of game-related content on the user interface 307.

Further, gaming rule provisioning may be conducted wholly at the game play system 300, wholly at the in-store server 358, or at a combination of the game play system 300 and one or more of the in-store server 358, the electronic payment system 355, and the financial payment processor 330. Further, the gaming provisioning may be done substantially in real-time, based on predetermined logic or rules that are regularly updated, or a combination of both. The game play system 300 may further direct or control the content displayed at a user interface 307 of the payment-enabled terminal 303 through one or more of the in-store server 358, the electronic payment system 355, and the financial payment processor 330. Generally speaking, the presentment of content displayed at the user interface 307 may be all or partially directed by the game play system 300, or may be all or partially directed by one or more of the in-store server 358, the electronic payment system 355, and the financial payment processor 330 associated with the payment-enabled terminal 303, or may be a combination of one or more of the in-store server 358, the electronic payment system 355, and the financial payment processor 330 presentment of content and game play system 300 presentment of content. Further, presenting content to the user at the payment-enabled terminal 303 may be done substantially in real-time, based on predetermined logic that is regularly updated, or a combination of both.

Figure 3D:
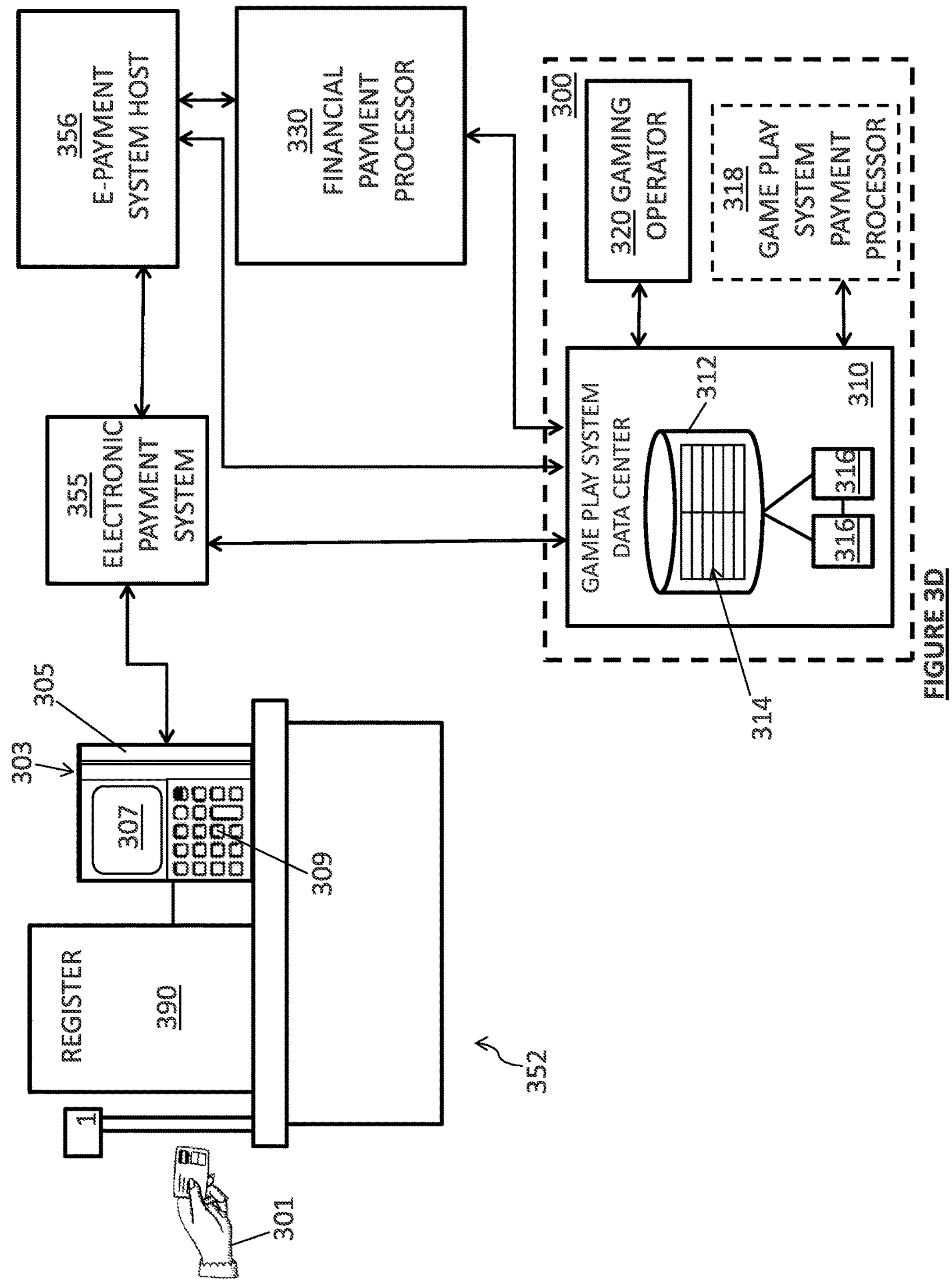
FIG. 3D is a schematic diagram illustrating a game play system in communication with a grocery payment system, in accordance with the present disclosure.

FIG. 3D is a schematic diagram illustrating a game play system in communication with another embodiment of the grocery payment system 352. The grocery payment system 352 includes a networked register 390, payment-enabled terminal 303, an electronic payment system 355, an electronic payment system host 356, and a financial payment processor 330. The payment-enabled terminal 303 is in communication with the electronic payment system 355, which communicates with an electronic payment system host 356, which communicates with a financial payment processor 330.

The game play system 300 may communicate with the electronic payment system host 356 or with the electronic payment system 355 to effect a game play purchase by the user 301. Thus, the game play system 300 directs the game play purchase via the electronic payment system host 356 or the electronic payment system 355. The game play system 300 may also communicate with the financial payment processor 330 or the game play system payment processor 318 to effect the game play purchase transaction. The game play system 300 is communication with the electronic payment system host 356 or with the electronic payment system 355. The electronic payment system host 356 is located remotely from and in communication with the electronic payment system 355 associated with the in-lane grocery payment system 352. The electronic payment system host 356 is in communication with the transaction processing server 316. Thus, the transaction processing server 316 receives the payment card number from the electronic payment system host 356 or from the electronic payment system 355. The transaction processing server 316 also may provide instructions to the electronic payment system host 356 or the electronic payment system 355 for directing the display of game-related content on the user interface 307.

Further, gaming rule provisioning may be conducted wholly at the game play system 300, wholly at one or more of the electronic payment system host 356 or the electronic payment system 355, or at a combination of the game play system 300 and one or more of the electronic payment system host 356 or the electronic payment system 355. Further, the gaming provisioning may be done substantially in real-time, based on predetermined logic or rules that are regularly updated, or a combination of both. The game play system 300 may further direct or control the content displayed at a user interface 307 of the payment-enabled terminal 303 through one or more of the electronic payment system host 356 or the electronic payment system 355. Generally speaking, the presentment of content displayed at the user interface 307 may be all or partially directed by the game play system 300, or may be all or partially directed by one or more of the electronic payment system host 356 or the electronic payment system 355 associated with the payment-enabled terminal 303, or may be a combination of one or more of the electronic payment system host 356 or the electronic payment system 355 presentment of content and game play system 300 presentment of content. Further, presenting content to the user at the payment-enabled terminal 303 may be done substantially in real-time, based on predetermined logic that is regularly updated, or a combination of both.

Figure 3E:
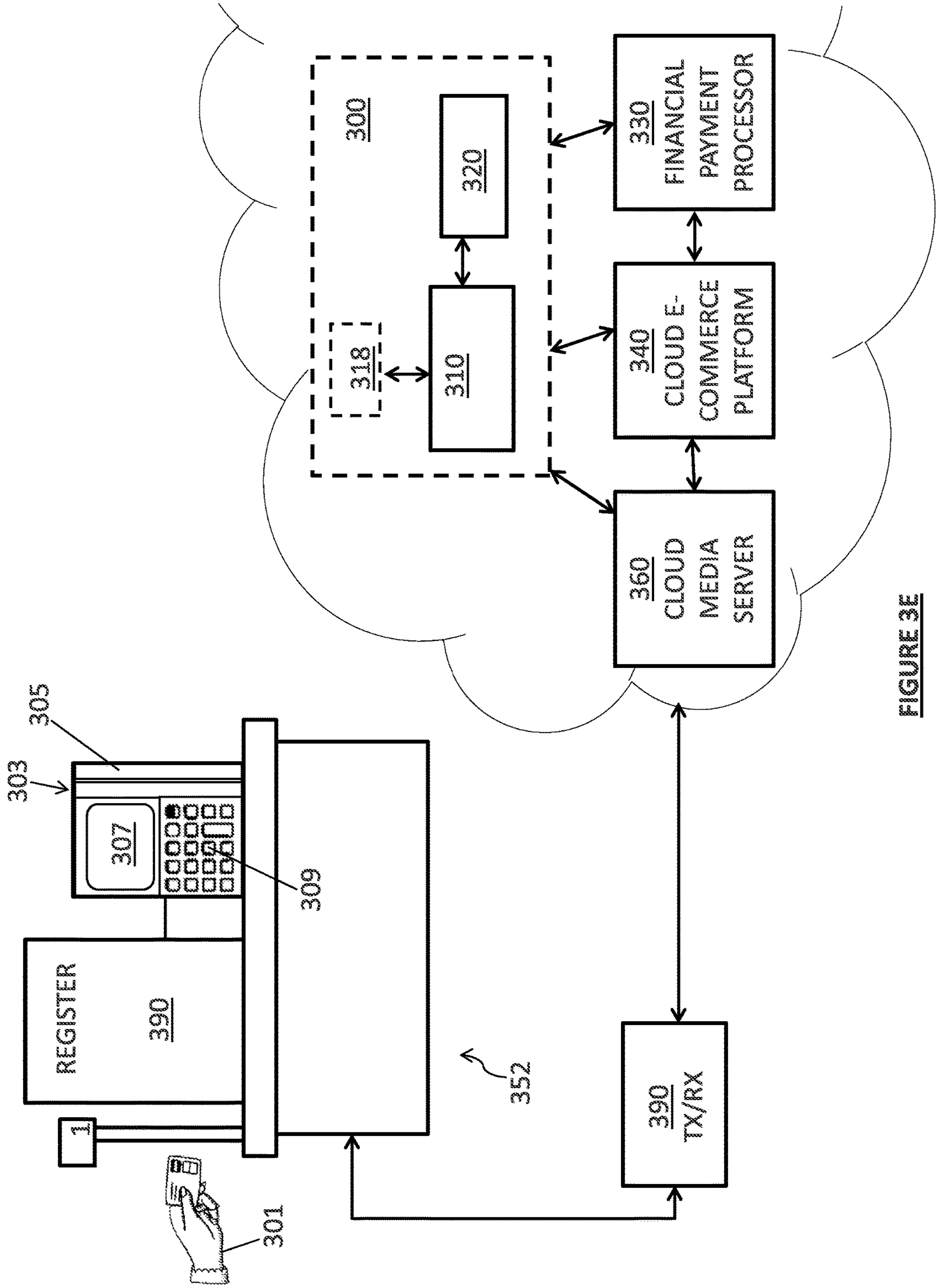
FIG. 3E is a schematic diagram illustrating a game play system in communication with a grocery payment system, in accordance with the present disclosure.

FIG. 3E is a schematic diagram illustrating a game play system 300 in communication with a cloud-based embodiment of a grocery payment system 352. The grocery payment system 352 may include a register 390, payment enabled terminal 303, and a transmitter-receiver 390. The transmitter-receiver 390 may send and receive communications to and from a cloud-based media server 360, a cloud e-commerce platform 340, and a financial payment processor 330 to effect a grocery payment transaction. The transmitter-receiver 390 may further be in communication with the game play system 300. The game play system 300 may also be in communication with the cloud-based media server 360, the cloud e-commerce platform 340, and/or the financial payment processor 330.

The game play system 300 receives the payment card number from the transmitter-receiver 390 either directly or indirectly through one or more of the cloud media server 360, cloud e-commerce platform 340, and financial payment processor 330. Thus, game play system 300 may communicate with the payment-enabled terminal 303 via the cloud to effect a game play purchase.

Figure 4A:
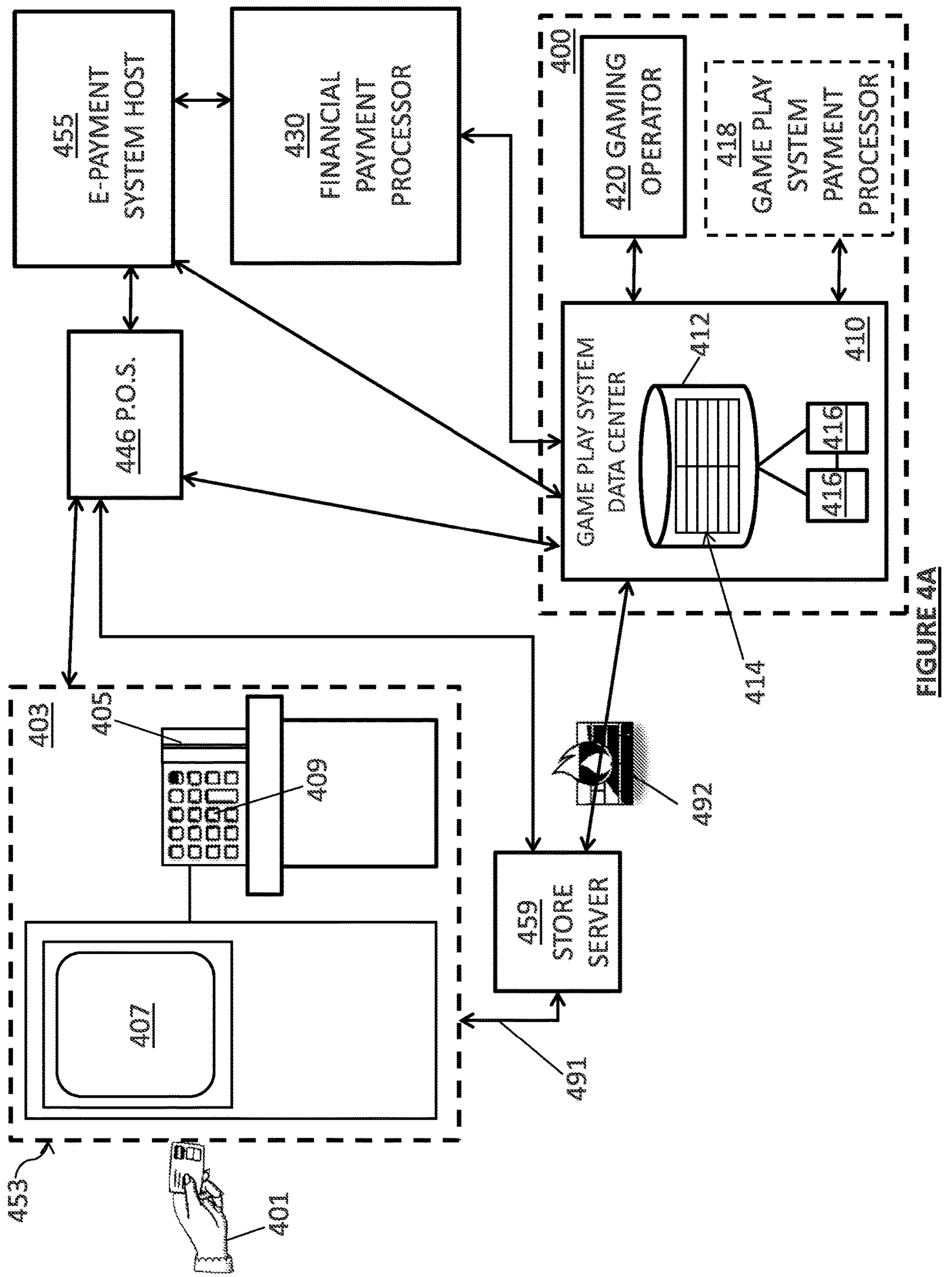
FIG. 4A is a schematic diagram illustrating a game play system in communication with a self-service grocery payment system, in accordance with the present disclosure.

FIG. 4A is a schematic diagram illustrating a game play system in communication with a self-service grocery payment system 453. The game play system 400 may include a game play data center 410 having a game play transaction database 412 for storing game play records 414 and one or more game play transaction processing servers 416 in communication with the transaction database 412.

The game play data center 410 is in communication with a gaming operator 420 having one or more gaming operator servers 426. The gaming operator servers (see, e.g., FIG. 1A) are operable to generate game play number sets, and the transaction processing server 416 receives a game play number set for a given game play transaction from the gaming operator 420. In an embodiment, the gaming operator is part of the game play system 400, and includes one or more gaming operator servers in communication with the game play transaction processing servers 416 over an inter-system network. In another embodiment, the gaming operator 420 is located remotely from the game play system 400 and is in communication with the game play transaction processing servers 416 over a secure network connection. In either embodiment, the game play transaction processing servers 416 are operable to receive information from the gaming operator 420 and/or gaming operator servers relating to a game play transaction.

In some embodiments, the game play system 400 further comprises a game play system payment processor 418 in communication with the game play data center 410. The game play system payment processor 418 may conduct a financial transaction associated with the game play purchase independent of the financial payment processor 430, upon receiving communications from the game play transaction processing servers 416 to that effect. In other embodiments, the game play system 400 communicates with the financial payment processor 430 to initiate a financial transaction associated with the game play purchase.

The self-service grocery payment system 453 may include a payment-enabled terminal 403, an in-store point of sale 446, an electronic payment system host 455, and financial payment processor 430. The self-service grocery payment system 453 may further include a kiosk server 459 in communication with the user interface 407. In an embodiment, the user interface 407 is a media screen, and the kiosk server 459 provides media content for display on the media screen.

The payment-enabled terminal may be a self-service kiosk, and the transaction processing server 416 may receive the payment card number from the kiosk server 459 in communication with the self service kiosk. In an embodiment, the kiosk server 459 is connected with the self-service kiosk through a local grocery store network 491, and the transaction processing server 416 communicates with the kiosk server 459 through a firewall 492 associated with the local grocery store network 491.

Thus, the transaction processing server 416 of the game play system 400 may receive the payment card number from the kiosk server 459. The payment-enabled terminal 403 may include a user interface 407 for interacting with a user 401 and swipe 405 for reading a user payment card. Thus, the payment card number may be identified when the user 401 swipes its payment card at the payment-enabled terminal 403, or when a payment card number is otherwise determined (e.g., via "tap" of a mobile device or NFC communication) at the payment-enabled terminal 403. The payment-enabled terminal 403 may further include a pin pad 409. In an embodiment, the user interface 407 comprises a media screen. The media screen may display media content guiding the user 401 through a game play purchase, and the media content may be received from the kiosk server 459 in communication with the transaction processing server 416. The game play system 400 may also be in communication with the POS 446, e-payment system host 455 and/or the financial payment processor 430, and the game play transaction servers 416 may receive the payment card number from any of the POS 446, e-payment system host 455 and/or the financial payment processor 430.

As discussed above in relation to FIGS. 1A and 1B, gaming rule provisioning may be conducted wholly at the game play system 400, wholly at the fuel payment system 453 associated with the payment-enabled terminal 403 (or the payment-enabled terminal 403 itself), or at a combination of the game play system 400 and the fuel payment system 453. Further, the gaming provisioning may be done substantially in real-time, based on predetermined logic or rules that are regularly updated, or a combination of both. The game play system 400 may further direct or control the content displayed at a user interface 407 of the payment-enabled terminal 403. Generally speaking, the presentment of content displayed at the user interface 407 may be all or partially directed by the game play system 400, or may be all or partially directed by the fuel payment system 453 associated with the payment-enabled terminal 403, or may be a combination of fuel payment system 453 presentment of content and game play system 400 presentment of content. Further, presenting content to the user at the payment-enabled terminal 403 may be done substantially in real-time, based on predetermined logic that is regularly updated, or a combination of both.

Figure 4B:
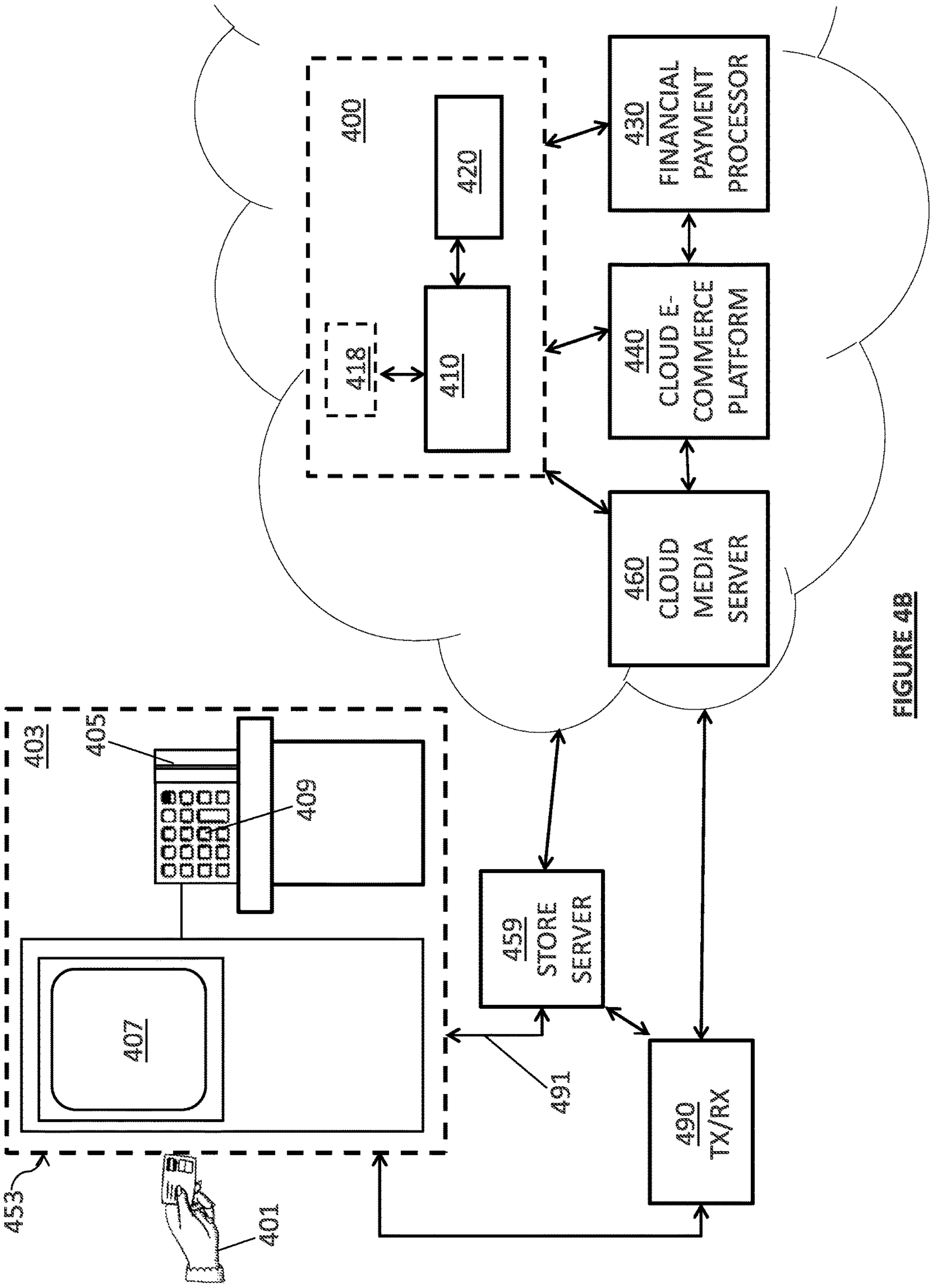
FIG. 4B is a schematic diagram illustrating a game play system in communication with a self-service grocery payment system, in accordance with the present disclosure.

FIG. 4B is a schematic diagram illustrating a game play system 300 in communication with a cloud-based embodiment of a kiosk system 453. The kiosk system 453 may include a kiosk with user interface 407, payment enabled terminal 403, store server 459, and/or a transmitter-receiver 490. The transmitter-receiver 490 may send and receive communications to and from a cloud-based media server 460, a cloud e-commerce platform 440, and a financial payment processor 430 to effect a grocery payment transaction. The transmitter-receiver 490 may further be in communication with the game play system 400. The game play system 400 may also be in communication with the cloud-based media server 460, the cloud e-commerce platform 440, and/or the financial payment processor 430.

The game play system 400 receives the payment card number from the transmitter-receiver 490 either directly or indirectly through one or more of the cloud media server 460, cloud e-commerce platform 440, and financial payment processor 430. Thus, game play system 400 may communicate with the payment-enabled terminal 403 via the cloud to effect a game play purchase.

Figure 5:
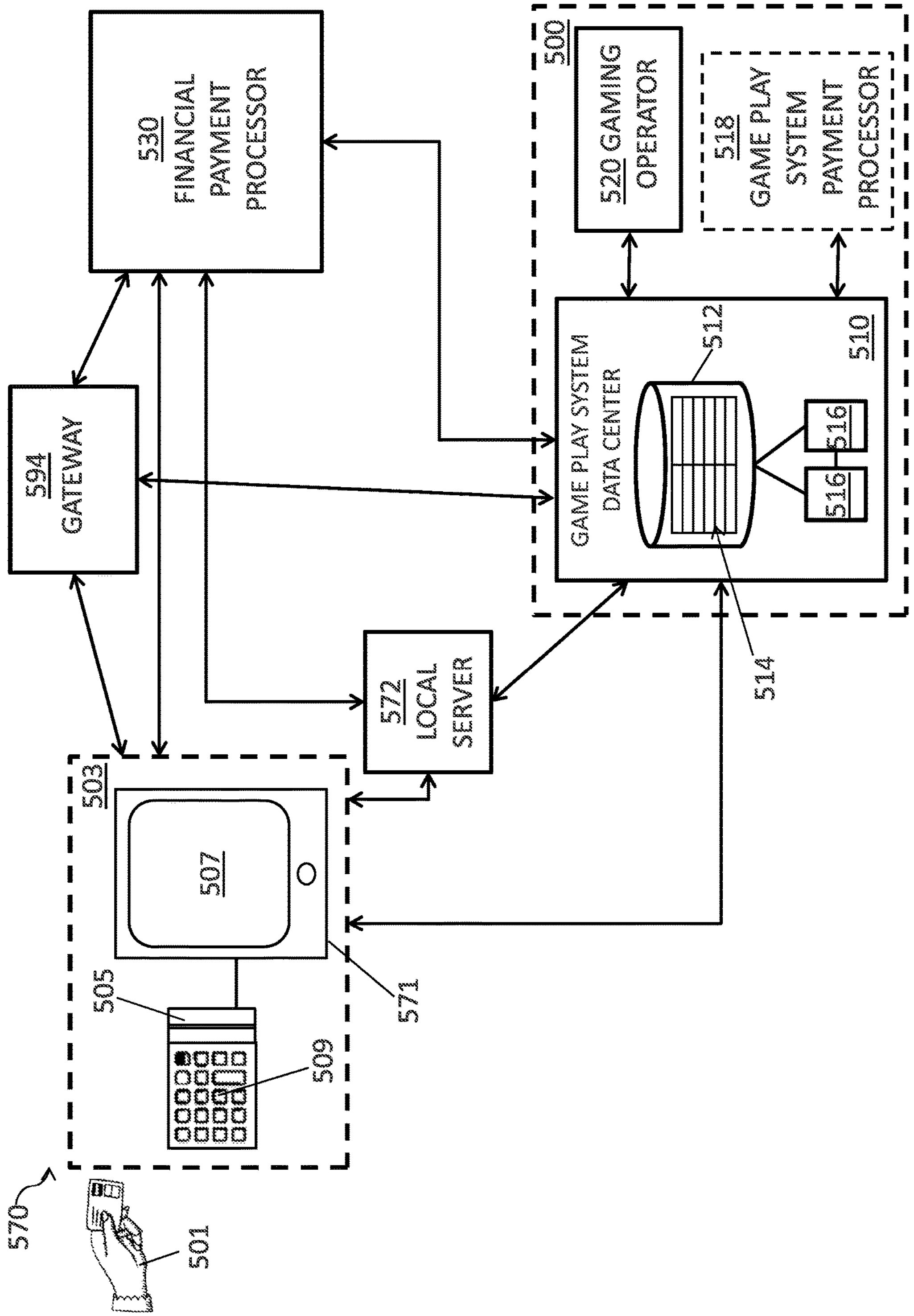
FIG. 5 is a schematic diagram illustrating a game play system in communication with an electronic tablet payment system, in accordance with the present disclosure.

FIG. 5 is a schematic diagram illustrating a game play system in communication with an electronic tablet payment system 570. The game play system 500 may include a game play data center 510 having a game play transaction database 512 for storing game play records 514 and one or more game play transaction processing servers 516 in communication with the transaction database 512.

The game play data center 540 is in communication with a gaming operator 520 having one or more gaming operator servers (see, e.g. FIG. 1A). The gaming operator servers are operable to generate game play number sets, and the transaction processing server 516 receives a game play number set for a given game play transaction from the gaming operator 520. In an embodiment, the gaming operator is part of the game play system 500, and includes one or more gaming operator servers in communication with the game play transaction processing servers 516 over an intersystem network. In another embodiment, the gaming operator 520 is located remotely from the game play system 500 and is in communication with the game play transaction processing servers 516 over a secure network connection. In either embodiment, the game play transaction processing servers 516 are operable to receive information from the gaming operator 520 and/or gaming operator servers relating to a game play transaction.

In some embodiments, the game play system 500 further comprises a game play system payment processor 518 in communication with the game play data center 510. The game play system payment processor 518 may conduct a financial transaction associated with the game play purchase independent of the financial payment processor 530, upon receiving communications from the game play transaction processing servers 516 to that effect. In other embodiments, the game play system 500 communicates with the financial payment processor 530 to initiate a financial transaction associated with the game play purchase.

The electronic tablet payment system 570 may include a payment-enabled terminal 503, local tablet server 572, a gateway 594, and financial payment processor 530. The local tablet server 572 is in communication with the user interface 507 of the payment-enabled terminal 503. In an embodiment, the payment-enabled terminal 503 comprises an electronic tablet 571 and a swipe 505. The payment-enabled terminal 503 may further comprise a pin pad 509. In an embodiment, the user interface 507 is a media screen, and the local tablet server 572 provides media content for display on the media screen.

The transaction processing server 516 may receive the payment card number from the local tablet server 572 in communication with the electronic tablet 571. In an embodiment, the local tablet server 572 is connected with the electronic tablet 571 through a local network, and the transaction processing server 516 communicates with the local tablet server 572. Thus, the transaction processing server 516 may receive the payment card number from the electronic tablet payment system 570. The transaction processing server 516 may receive the payment card number from the swipe enabled terminal 503, the local server 572, the gateway 594, and/or the financial payment processor 530.

Thus, the transaction processing server 516 of the game play system 500 may receive the payment card number from the local tablet server 572. The payment-enabled terminal 503 may include a user interface 507 for interacting with a user 501 and swipe 505 for reading a user payment card. Thus, the payment card number may be identified when the user 501 swipes its payment card at the payment-enabled terminal 503, or when a payment card number is otherwise determined (e.g., via "tap" of a mobile device or NFC communication) at the payment-enabled terminal 503. The media screen may display media content guiding the user 501 through a game play purchase, and the media content may be received from the local tablet server 572 in communication with the transaction processing server 516.

As discussed above in relation to FIGS. 1A and 1B, gaming rule provisioning may be conducted wholly at the game play system 500, wholly at the fuel payment system 570 associated with the payment-enabled terminal 503 (or the payment-enabled terminal 503 itself), or at a combination of the game play system 500 and the fuel payment system 570. Further, the gaming provisioning may be done substantially in real-time, based on predetermined logic or rules that are regularly updated, or a combination of both. The game play system 500 may further direct or control the content displayed at a user interface 507 of the payment-enabled terminal 503. Generally speaking, the presentment of content displayed at the user interface 507 may be all or partially directed by the game play system 500, or may be all or partially directed by the fuel payment system 570 associated with the payment-enabled terminal 503, or may be a combination of fuel payment system 570 presentment of content and game play system 500 presentment of content. Further, presenting content to the user at the payment-enabled terminal 503 may be done substantially in real-time, based on predetermined logic that is regularly updated, or a combination of both.

Figure 6A:
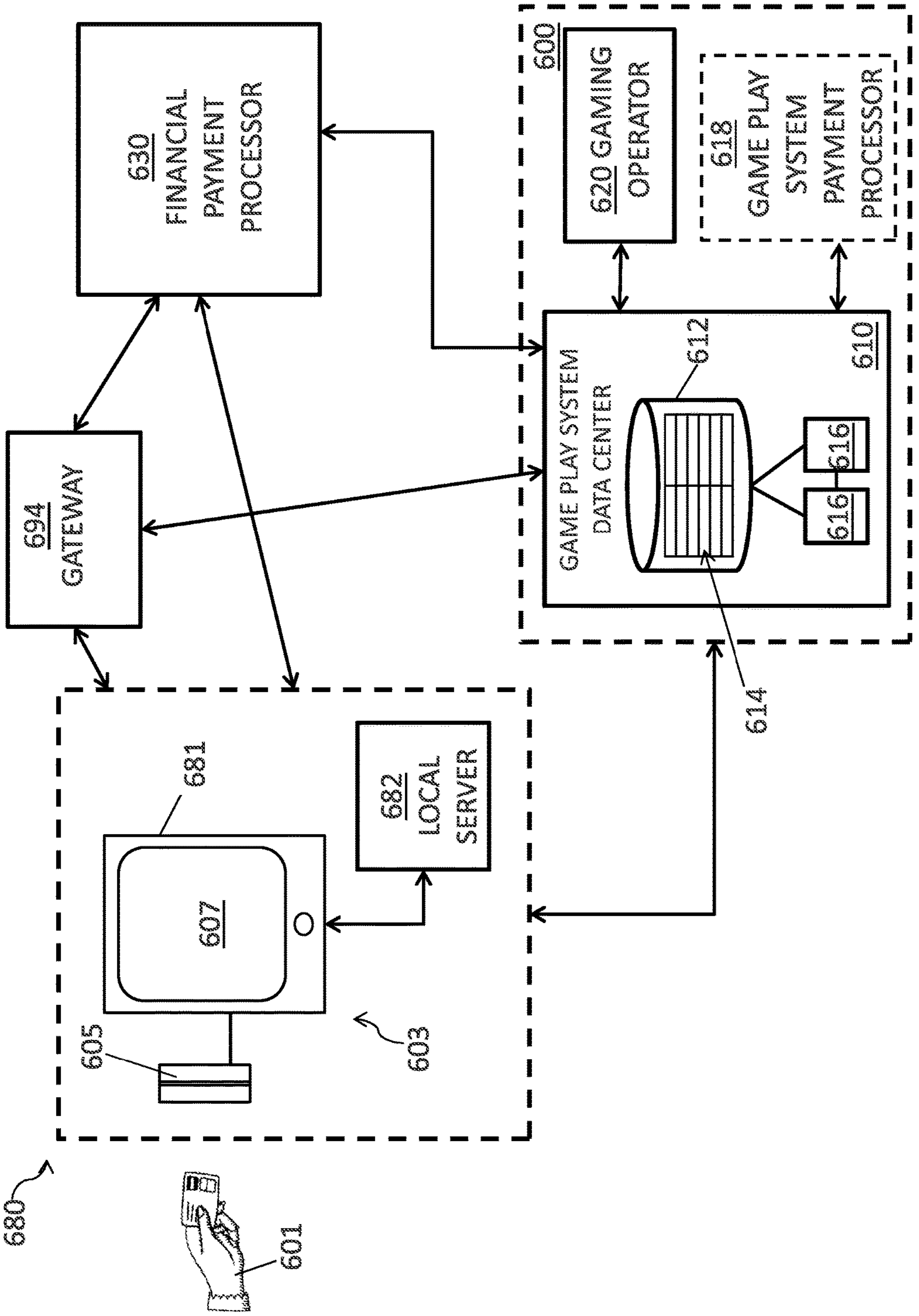
FIG. 6A is a schematic diagram illustrating a game play system in communication with an electronic tablet payment system, in accordance with the present disclosure.

FIG. 6A is a schematic diagram illustrating a game play system 600 in communication with an electronic tablet payment system 680. The game play system 600 may include a game play data center 610 having a game play transaction database 612 for storing game play records 614 and one or more game play transaction processing servers 616 in communication with the transaction database 612.

The game play data center 610 is in communication with a gaming operator 620 having one or more gaming operator servers (see, e.g., FIG. 1A). The gaming operator servers are operable to generate game play number sets, and the transaction processing server 616 receives a game play number set for a given game play transaction from the gaming operator 620. In an embodiment, the gaming operator is part of the game play system 600, and includes one or more gaming operator servers in communication with the game play transaction processing servers 616 over an intersystem network. In another embodiment, the gaming operator 620 is located remotely from the game play system 600 and is in communication with the game play transaction processing servers 616 over a secure network connection. In either embodiment, the game play transaction processing servers 616 are operable to receive information from the gaming operator 620 and/or gaming operator servers relating to a game play transaction.

In some embodiments, the game play system 600 further comprises a game play system payment processor 618 in communication with the game play data center 610. The game play system payment processor 618 may conduct a financial transaction associated with the game play purchase independent of the financial payment processor 630, upon receiving communications from the game play transaction processing servers 616 to that effect. In other embodiments, the game play system 600 communicates with the financial payment processor 630 to initiate a financial transaction associated with the game play purchase.

The electronic tablet payment system 680 may include a payment-enabled terminal 603, gateway 694, financial payment processor 630, and local tablet server 682. The local tablet server 682 is in communication with the user interface 607 of the payment-enabled terminal 603. In an embodiment, the payment-enabled terminal 603 comprises an electronic tablet 681 and a swipe 605. In an embodiment, the user interface 607 is a media screen, and the local tablet server 682 provides media content for display on the media screen.

The transaction processing server 616 may receive the payment card number from the electronic tablet 681 in communication with the local tablet server 682. In an embodiment, the local tablet server 682 is connected with the electronic tablet 671 through a local network, and the transaction processing server 616 communicates with the electronic tablet 681. Thus, the transaction processing server 616 may receive the payment card number from the electronic tablet 681. In other embodiments, the transaction processing server 616 may receive the payment card number from the gateway 694 or financial payment processor 630.

Thus, the transaction processing server 616 of the game play system 600 may receive the payment card number from the electronic tablet system 680. The payment-enabled terminal 603 may include a user interface 607 for interacting with a user 601 and swipe 605 for reading a user payment card. Thus, the payment card number may be identified when the user 601 swipes its payment card at the payment-enabled terminal 603, or when a payment card number is otherwise determined (e.g., via "tap" of a mobile device or NFC communication) at the payment-enabled terminal 603. The media screen may display media content guiding the user 601 through a game play purchase, and the media content may be provided to the electronic tablet 681 by the local tablet server 682, the game play transaction processing server 616, or a combination of both.

As discussed above in relation to FIGS. 1A and 1B, gaming rule provisioning may be conducted wholly at the game play system 600, wholly at the fuel payment system 680 associated with the payment-enabled terminal 603 (or the payment-enabled terminal 603 itself), or at a combination of the game play system 600 and the fuel payment system 680. Further, the gaming provisioning may be done substantially in real-time, based on predetermined logic or rules that are regularly updated, or a combination of both. The game play system 600 may further direct or control the content displayed at a user interface 607 of the payment-enabled terminal 603. Generally speaking, the presentment of content displayed at the user interface 607 may be all or partially directed by the game play system 600, or may be all or partially directed by the fuel payment system 680 associated with the payment-enabled terminal 603, or may be a combination of fuel payment system 680 presentment of content and game play system 600 presentment of content. Further, presenting content to the user at the payment-enabled terminal 603 may be done substantially in real-time, based on predetermined logic that is regularly updated, or a combination of both.

Figure 6B:
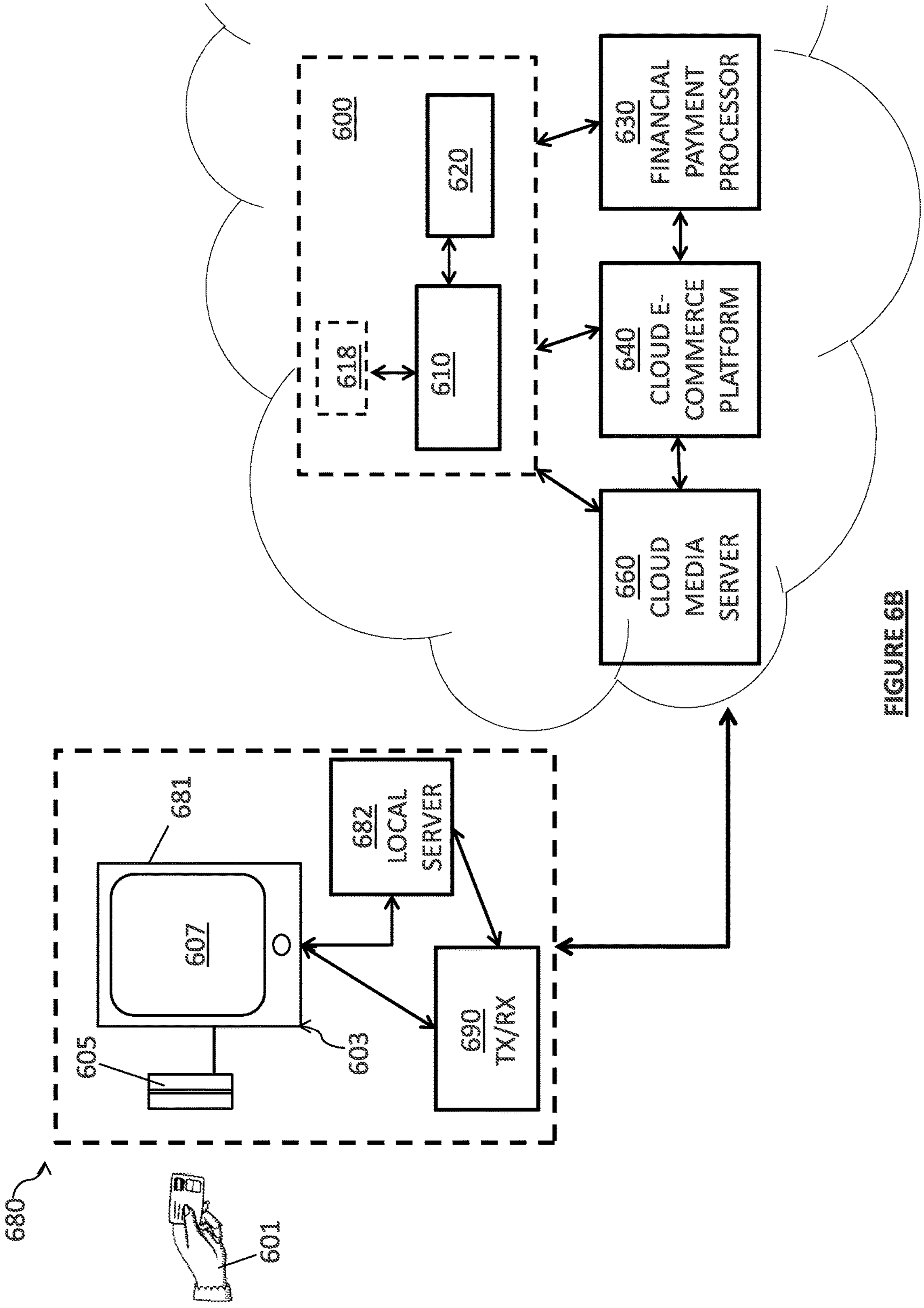
FIG. 6B is a schematic diagram illustrating a game play system in communication with a cloud-based embodiment of a electronic tablet payment system, in accordance with the present disclosure.

FIG. 6B is a schematic diagram illustrating a game play system 600 in communication with a cloud-based embodiment of a electronic tablet payment system 680. The electronic tablet payment system 680 may include a kiosk with user interface 607, payment enabled terminal 603, local server 682, and/or a transmitter-receiver 690. The transmitter-receiver 690 may send and receive communications to and from a cloud-based media server 660, a cloud e-commerce platform 640, and a financial payment processor 630 to effect a grocery payment transaction. The transmitter-receiver 690 may further be in communication with the game play system 600. The game play system 600 may also be in communication with the cloud-based media server 660, the cloud e-commerce platform 640, and/or the financial payment processor 630.

The game play system 600 receives the payment card number from the transmitter-receiver 690 either directly or indirectly through one or more of the cloud media server 460, cloud e-commerce platform 640, and financial payment processor 630. Thus, game play system 600 may communicate with the payment-enabled terminal 603 via the cloud to effect a game play purchase.

Figure 7:
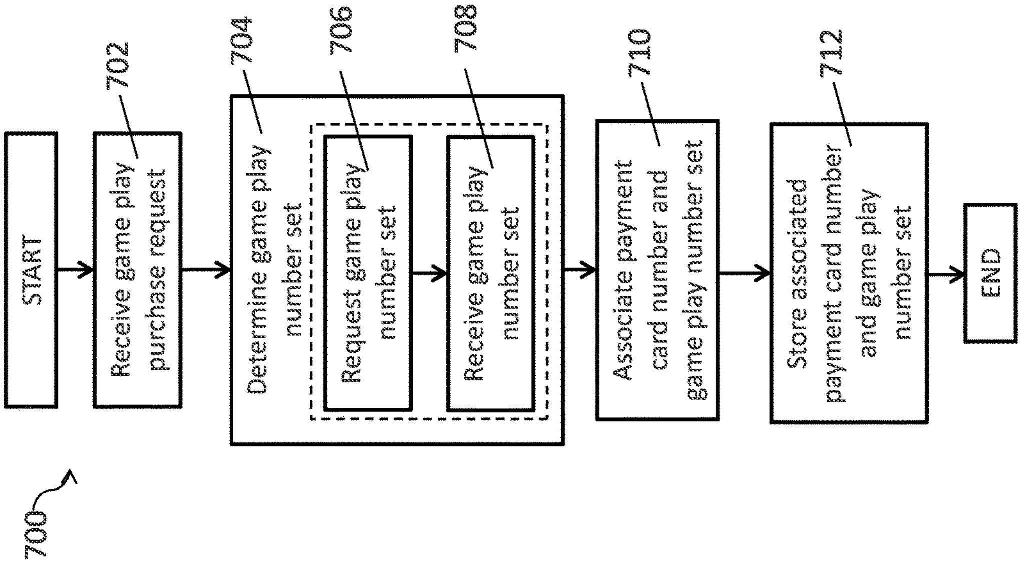
FIG. 7 is a flow diagram illustrating a game play purchase in the game play system, in accordance with the present disclosure.

FIG. 7 is a flow diagram illustrating a game play purchase process 700 in the game play system. The game play purchase is made by a user at a payment-enabled terminal. The game play purchase process 700 may include receiving, at a game play transaction processing server, a game play purchase request (action 702). The game play purchase request may include a payment card number.

The game play purchase process 700 may also include determining a game play number set in response to the game play purchase request (action 704). The determining may further include requesting a game play number set (action 706) from a gaming operator and receiving the game play number set (action 708) from the gaming operator. Thus, determining the game play number set may include receiving the game play number set from a remote gaming operator. Alternatively, the determining the game play number set may include generating the game play number set at one or more gaming operator servers in communication with the game play transaction processing server over a local network. Thus, the determining may be done locally at a gaming operator server in communication with the game play transaction processing server.

The game play purchase process 700 may also include associating, at the transaction processing server, the payment card number with the game play number set (action 710). The game play purchase process 700 may also include storing, at a game play transaction database, the associated payment card number and game play number set (action 712).

The receiving (action 702) may include receiving the game play purchase request may include receiving the payment card number from a fuel pump system; receiving the payment card number from a grocery payment system; and/or receiving the payment card number from an electronic tablet payment system.

The game play purchase process 700 may further include determining, at the transaction processing server, gaming rules associated with a jurisdiction associated with the payment-enabled terminal by referencing gaming rules stored in the transaction database. The game play purchase 700 process may further include provisioning the gaming rules after receiving the game play purchase request. (Not shown.) The provisioning may include administering age, payment card, responsible game play, and/or time restrictions.

The game play purchase process 700 may allow for effecting ticketless game plays by associating the payment card number with the game play number set. The game play purchase process 700 may also allow for managing ticketless game plays by storing the plurality of records of game play number sets associated with respective payment card numbers at the transaction database. The game play purchase process 700 may also allow for effecting automatic winner redemption by initiating payment to an account associated with a payment card number associated with a winning game play number set. Further, the game play purchase process 700 may allow for managing second chance game plays based on the plurality of records of game play number sets associated with respective payment card numbers stored at the transaction database. Pre-registration is not required for second chance games, as the second chance player may be associated with its payment card number. The payment card number used in the game play purchase process 700 may be a credit or debit card number.

Various aspects, features, and functionality relating to game play purchases in the game play system and/or using the game play methods are discussed in further detail in commonly-assigned U.S. patent application and Provisional patent application Ser. Nos. 11/734,207, 13/280,196, 61/593,762, 61/696,533, 13/757,512, and 13/829,776, which are each herein incorporated by reference for all purposes.

Figure 8:
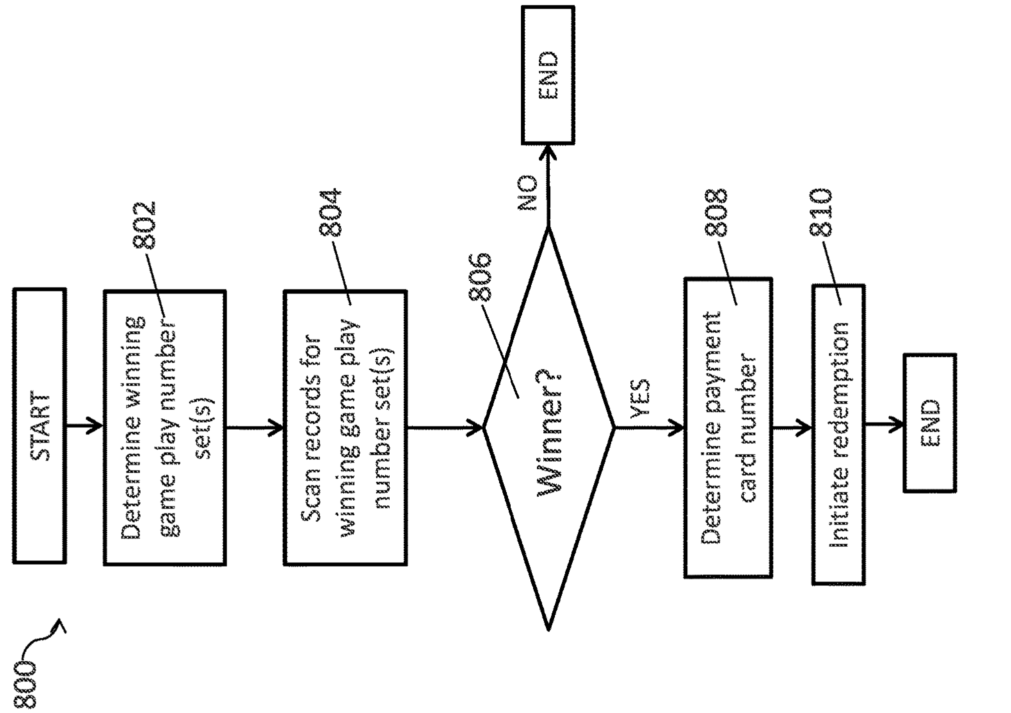
FIG. 8 is a flow diagram illustrating automatic redemption of a winning game play purchase in the game play system, in accordance with the present disclosure.

FIG. 8 is a flow diagram illustrating an automatic redemption process 800 for a winning game play purchase in the game play system. The automatic redemption process 800 may include determining, at a game play transaction processing server, one or more winning game play number sets (action 802). The automatic redemption process 800 may further include querying a game play transaction database for the one or more winning game play number sets (action 804). The game play transaction database includes a plurality of records of game play number sets associated with respective payment card numbers.

The automatic redemption process 800 may further include determining whether a winner exists (action 806). For example, if a record in the plurality of records of game play number sets associated with respective payment card numbers matches the one or more winning game play number sets, a winner is determined (YES), and the automatic redemption process 800 may further include determining a payment card number associated with the matching record (action 808), and initiating a redemption payment using the payment card number (action 810). Initiating a redemption payment (action 810) may include initiating payment to an account associated with the payment card number. If a record in the plurality of records of game play number sets associated with respective payment card numbers does not match the one or more winning game play number sets, a winner is not determined (NO), and the process 800 ends for a particular gaming instance. The process 800 may be repeated for other gaming instances—for example, other games in a given jurisdiction, other dates, other jurisdictions, etc.

Various aspects, features, and functionality relating to redemption in the game play system and/or using the game play methods are discussed in further detail in commonly-assigned U.S. patent application and Provisional patent application Ser. Nos. 11/734,207, 13/280,196, 61/593,762, 61/696,533, 13/757,512, and 13/829,776, which are each herein incorporated by reference for all purposes.

While various embodiments in accordance with the disclosed principles have been described above, it should be understood that they have been presented by way of example only, and are not limiting. Thus, the breadth and scope of the invention(s) should not be limited by any of the above-described exemplary embodiments, but should be defined only in accordance with the claims and their equivalents issuing from this disclosure. Furthermore, the above advantages and features are provided in described embodiments, but shall not limit the application of such issued claims to processes and structures accomplishing any or all of the above advantages.

Additionally, the section headings herein are provided for consistency with the suggestions under 37 C.F.R. 1.77 or otherwise to provide organizational cues. These headings shall not limit or characterize the invention(s) set out in any claims that may issue from this disclosure. Specifically and by way of example, although the headings refer to a "Technical Field," such claims should not be limited by the language chosen under this heading to describe the so-called technical field. Further, a description of a technology in the "Background" is not to be construed as an admission that technology is prior art to any invention(s) in this disclosure. Neither is the "Summary" to be considered as a characterization of the invention(s) set forth in issued claims. Furthermore, any reference in this disclosure to "invention" in the singular should not be used to argue that there is only a single point of novelty in this disclosure. Multiple inventions may be set forth according to the limitations of the multiple claims issuing from this disclosure, and such claims accordingly define the invention(s), and their equivalents, that are protected thereby. In all instances, the scope of such claims shall be considered on their own merits in light of this disclosure, but should not be constrained by the headings herein.

What is claimed is:

1. A processing system configured to:

receive, from a transaction terminal, identification information associated with a user, wherein the receipt of the identification information is caused by an identification transaction performed at the transaction terminal;

determine a game play set associated with the identification information;

determine gaming rules associated with a jurisdiction for the transaction terminal, wherein the gaming rules are provisioned in response to receiving a game play request at the transaction terminal, wherein a first portion of the gaming rules is provisioned at the transaction terminal, and wherein a second portion of the gaming rules is provisioned by a remote processing system not at the transaction terminal, and where the gaming rules are provisioned substantially simultaneously to receiving the game play request;

determine, based on the gaming rules, whether the user associated with the identification information is eligible to participate in a game associated with the jurisdiction; and in response to determining the user associated with the identification information is eligible to participate in the game associated with the jurisdiction, enable participation of the game play set associated with the identification information in the game associated with the jurisdiction, wherein presentment of game-related content associated with the game at the transaction terminal is controlled by control data associated with the identification information, and wherein the presentment of the game-related content associated with the game at the transaction terminal is further based on an attribute of the transaction terminal, wherein the attribute of the transaction terminal further comprises a location of the transaction terminal, and wherein first game-related content for a particular game presented at a first transaction terminal associated with a first location is different from second game-related content for the particular game presented at a second transaction terminal at a second location.

2. The processing system of claim 1, wherein participation of the game play set associated with the identification information in the game associated with the jurisdiction comprises ticketless participation in the game.

3. The processing system of claim 1, wherein the identification transaction comprises a payment transaction.

4. The processing system of claim 1, wherein the identification information comprises payment information.

5. The processing system of claim 1, wherein the identification transaction comprises a transaction other than a transaction for purchase of the game play set.

6. The processing system of claim 5, further configured to:

determine whether a winning game play set exists in the game;

determine whether the winning game play set matches a game play set participating in the game;

in response to determining the winning game play set matches the game play set associated with the identification information, determine an account associated with the identification information; and initiate payment to the account.

7. The processing system of claim 1, further configured to:

determine whether a winning game play set exists in the game;

determine whether the winning game play set matches a game play set participating in the game;

in response to determining the winning game play set matches the game play set associated with the identification information, determine an account associated with the identification information; and initiate payment to the account, wherein the account is identified when the identification transaction is performed at the transaction terminal.

8. The processing system of claim 1, wherein the game play set is stored in a database.

9. The processing system of claim 1, wherein the game play set is generated by a gaming operator.

10. The processing system of claim 1, wherein the game is presented on the transaction terminal.

11. The processing system of claim 10, wherein content associated with the game presented on a user interface of the transaction terminal is at least partially directed or controlled by the processing system.

12. The processing system of claim 1, wherein the identification transaction comprises a contact transaction.

13. The processing system of claim 1, wherein the identification transaction comprises a contactless transaction.

14. The processing system of claim 1, wherein the transaction terminal is associated with a gas or fuel pump.

15. The processing system of claim 1, wherein the transaction terminal comprises a point of sale terminal.

16. The processing system of claim 1, wherein the transaction terminal comprises a grocery store terminal.

17. The processing system of claim 1, wherein the transaction terminal comprises a self-service kiosk.

18. The processing system of claim 1, wherein the transaction terminal comprises a mobile device.

19. The processing system of claim 1, wherein the game play set comprises a lottery game play set.

20. The processing system of claim 1, wherein the processing system is further configured to initiate or facilitate purchase of the game play set.

21. The processing system of claim 1, wherein the attribute of the transaction terminal further comprises a display capability of the transaction terminal.

22. The processing system of claim 1, wherein the attribute of the transaction terminal further comprises a capability of connecting to a mobile network.

23. The processing system of claim 1, wherein logic for the presentment of the game-related content is updated based on the attribute of the transaction terminal.

24. The processing system of claim 1, wherein the presentment of the game-related content is further based on a connection between the processing system and the transaction terminal.

25. The processing system of claim 1, wherein logic for the presentment of the game-related content is updated based on a connection between the processing system and the transaction terminal.

26. The processing system of claim 1, wherein the determination of whether the user associated with the identification information is eligible to participate in the game associated with the jurisdiction is performed at at least one of the processing system or the transaction terminal.

27. The processing system of claim 26, wherein the performance of the determination of whether the user associated with the identification information is eligible to participate in the game associated with the jurisdiction at the at least one of the processing system or the transaction terminal is further based on at least one of the attribute of the transaction terminal or a connection between the processing system and the transaction terminal.

28. The processing system of claim 1, wherein determining whether the user associated with the identification information is eligible to participate in the game associated with the jurisdiction comprises provisioning the gaming rules.

29. The processing system of claim 28, wherein the processing system is further configured to receive a request to play the game associated with the jurisdiction, wherein the provisioning of the gaming rules is performed after receiving the request to play the game.

30. The processing system of claim 28, wherein the gaming rules are additionally provisioned by a payment system different from the processing system.

31. The processing system of claim 30, wherein the processing system is further configured to receive a request to purchase the game associated with the jurisdiction, wherein the provisioning of the gaming rules by the payment system is performed after receiving the request to purchase the game.

32. The processing system of claim 1, wherein the identification information is received via a communications exchange server.

33. A method comprising:

receiving, from a transaction terminal, identification information associated with a user, wherein the receipt of the identification information is caused by an identification transaction performed at the transaction terminal;

determining a game play set associated with the identification information;

determining gaming rules associated with a jurisdiction for the transaction terminal, wherein the gaming rules are provisioned in response to receiving a game play request at the transaction terminal, wherein a first portion of the gaming rules is provisioned at the transaction terminal, and wherein a second portion of the gaming rules is provisioned by a remote processing system not at the transaction terminal, and where the gaming rules are provisioned substantially simultaneously to receiving the game play request;

determining, based on the gaming rules, whether the user associated with the identification information is eligible to participate in a game associated with the jurisdiction; and in response to determining the user associated with the identification information is eligible to participate in the game associated with the jurisdiction, enabling participation of the game play set associated with the identification information in the game associated with the jurisdiction, wherein presentment of game-related content associated with the game at the transaction terminal is controlled by control data associated with the identification information, and wherein the presentment of the game-related content associated with the game at the transaction terminal is further based on an attribute of the transaction terminal, wherein the attribute of the transaction terminal further comprises a location of the transaction terminal, and wherein first game-related content for a particular game presented at a first transaction terminal associated with a first location is different from second game-related content for the particular game presented at a second transaction terminal at a second location.

34. The method of claim 33, wherein participation of the game play set associated with the identification information in the game associated with the jurisdiction comprises ticketless participation in the game.

35. The method of claim 33, wherein the identification transaction comprises a payment transaction.

36. The method of claim 33, wherein the identification information comprises payment information.

37. The method of claim 33, wherein the identification transaction comprises a transaction other than a transaction for purchase of the game play set.

38. The method of claim 33, further comprising:

determining whether a winning game play set exists in the game;

determining whether the winning game play set matches a game play set participating in the game;

in response to determining the winning game play set matches the game play set associated with the identification information, determining an account associated with the identification information; and initiating payment to the account.

39. The method of claim 38, wherein the account is identified when the identification transaction is performed at the transaction terminal.

40. The method of claim 33, wherein the game play set is stored in a database.

41. The method of claim 33, wherein the game play set is generated by a gaming operator.

42. The method of claim 33, wherein the game is presented on the transaction terminal.

43. The method of claim 42, further comprising directing or controlling content associated with the game presented on a user interface of the transaction terminal.

44. The method of claim 33, wherein the identification transaction comprises a contact transaction.

45. The method of claim 33, wherein the identification transaction comprises a contactless transaction.

46. The method of claim 33, wherein the transaction terminal is associated with a gas or fuel pump.

47. The method of claim 33, wherein the transaction terminal comprises a point of sale terminal.

48. The method of claim 33, wherein the transaction terminal comprises a grocery store terminal.

49. The method of claim 33, wherein the transaction terminal comprises a self-service kiosk.

50. The method of claim 33, wherein the transaction terminal comprises a tablet.

51. The method of claim 33, wherein the transaction terminal comprises a mobile device.

52. The method of claim 33, wherein the game play set comprises a lottery game play set.

53. A method comprising:

executing, at a transaction terminal, an identification transaction performed by a user;

receiving, at the transaction terminal, identification information associated with the user;

transmitting, to a processing system, the identification information associated with the user, wherein the processing system:

determines a game play set associated with the identification information;

determines gaming rules associated with a jurisdiction for the transaction terminal, wherein the gaming rules are provisioned in response to receiving a game play request at the transaction terminal, wherein a first portion of the gaming rules is provisioned at the transaction terminal, and wherein a second portion of the gaming rules is provisioned by the processing system, wherein the processing system is not at the transaction terminal, and where the gaming rules are provisioned substantially simultaneously to receiving the game play request;

determines, based on the gaming rules, whether the user associated with the identification information is eligible to participate in a game associated with the jurisdiction; and enabling, at the transaction terminal, participation of the game play set associated with the identification information in the game associated with the jurisdiction, wherein presentment of game-related content associated with the game at the transaction terminal is controlled by control data associated with the identification information, and wherein the presentment of the game-related content associated with the game at the transaction terminal is further based on an attribute of the transaction terminal, wherein the attribute of the transaction terminal further comprises a location of the transaction terminal, and wherein first game-related content for a particular game presented at a first transaction terminal associated with a first location is different from second game-related content for the particular game presented at a second transaction terminal at a second location.

54. The method of claim 53, wherein participation of the game play set associated with the identification information in the game associated with the jurisdiction comprises ticketless participation in the game.

55. The method of claim 53, wherein the identification transaction comprises a payment transaction.

56. The method of claim 53, wherein the identification transaction comprises a transaction other than a transaction for purchase of the game play set.

57. The method of claim 53, wherein the processing system is further configured to:

determine whether a winning game play set exists in the game;

determine whether the winning game play set matches a game play set participating in the game;

in response to determining the winning game play set matches the game play set associated with the identification information, determine an account associated with the identification information; and initiate payment to the account.

58. The method of claim 53, wherein the game play set is stored in a database or is generated by a gaming operator.

59. The method of claim 53, wherein the identification transaction comprises a contact or contactless transaction.

* * * * *